United States Patent
El-Moussa et al.

(10) Patent No.: US 10,931,689 B2
(45) Date of Patent: Feb. 23, 2021

(54) MALICIOUS NETWORK TRAFFIC IDENTIFICATION

(71) Applicant: British Telecommunications Public Limited Company, London (GB)

(72) Inventors: Fadi El-Moussa, London (GB); George Kallos, London (GB)

(73) Assignee: British Telecommunications Public Limited Company, London (GB)

( * ) Notice: Subject to any disclaimer, the term of this patent is extended or adjusted under 35 U.S.C. 154(b) by 228 days.

(21) Appl. No.: 16/065,603

(22) PCT Filed: Dec. 22, 2016

(86) PCT No.: PCT/EP2016/082488
§ 371 (c)(1),
(2) Date: Jun. 22, 2018

(87) PCT Pub. No.: WO2017/109135
PCT Pub. Date: Jun. 29, 2017

(65) Prior Publication Data
US 2019/0207955 A1    Jul. 4, 2019

(30) Foreign Application Priority Data
Dec. 24, 2015 (EP) .................... 15202736

(51) Int. Cl.
*H04L 29/06*    (2006.01)
(52) U.S. Cl.
CPC ...... *H04L 63/1416* (2013.01); *H04L 63/1408* (2013.01); *H04L 63/1425* (2013.01); *H04L 63/1441* (2013.01)

(58) Field of Classification Search
CPC ............. H04L 63/1416; H04L 63/1408; G06F 21/562
(Continued)

(56) References Cited

U.S. PATENT DOCUMENTS

| | | | |
|---|---|---|---|
| 7,376,969 B1 | 5/2008 | Njemanze et al. | |
| 7,503,071 B1 | 3/2009 | Hernacki | |

(Continued)

FOREIGN PATENT DOCUMENTS

| | | |
|---|---|---|
| EP | 2 741 227 A1 | 6/2014 |
| WO | WO 0184285 A2 | 11/2001 |

(Continued)

OTHER PUBLICATIONS

U.S. Appl. No. 16/065,482, filed Jun. 22, 2018, Inventors: Kallos et al.
(Continued)

*Primary Examiner* — Jacob Lipman
(74) *Attorney, Agent, or Firm* — Patterson Thuente Pedersen, P.A.

(57) ABSTRACT

A method for identifying malicious network traffic communicated via a computer network, the method including: evaluating a measure of a correlation fractal dimension for a portion of network traffic over a monitored network connection; comparing the measure of correlation fractal dimension with a reference measure of correlation fractal dimension for a corresponding portion of network traffic of a malicious network connection so as to determine if malicious network traffic is communicated over the monitored network connection.

23 Claims, 25 Drawing Sheets

(58) Field of Classification Search
USPC .......................................................... 726/23
See application file for complete search history.

(56) References Cited

U.S. PATENT DOCUMENTS

| | | | |
|---|---|---|---|
| 7,716,739 | B1 | 5/2010 | McCorkendale et al. |
| 8,341,724 | B1 | 12/2012 | Burns et al. |
| 8,584,241 | B1 | 11/2013 | Jenks et al. |
| 8,898,788 | B1 | 11/2014 | Aziz et al. |
| 8,953,584 | B1 | 2/2015 | Wang |
| 9,009,825 | B1 | 4/2015 | Chang et al. |
| 9,122,877 | B2 | 9/2015 | Alperovitch et al. |
| 9,547,588 | B1 | 1/2017 | Biederman et al. |
| 9,807,106 | B2 | 10/2017 | Daniel et al. |
| 9,818,136 | B1 | 11/2017 | Hoffberg |
| 9,934,376 | B1 | 4/2018 | Ismael |
| 10,546,143 | B1 | 1/2020 | Wesson |
| 2002/0069318 | A1 | 6/2002 | Chow et al. |
| 2002/0186875 | A1 | 12/2002 | Burner |
| 2003/0084349 | A1 | 5/2003 | Friedrichs et al. |
| 2003/0126464 | A1 | 7/2003 | McDaniel |
| 2004/0230834 | A1 | 11/2004 | McCallam |
| 2005/0262562 | A1 | 11/2005 | Gassoway |
| 2006/0161984 | A1 | 7/2006 | Phillips et al. |
| 2006/0200253 | A1 | 9/2006 | Hoffberg |
| 2007/0240222 | A1 | 10/2007 | Tuvell et al. |
| 2007/0244974 | A1 | 10/2007 | Chasin |
| 2008/0294913 | A1 | 11/2008 | Nakagoe et al. |
| 2008/0320595 | A1 | 12/2008 | Van der Made |
| 2009/0034423 | A1 | 2/2009 | Coon et al. |
| 2009/0094618 | A1 | 4/2009 | Huntsman |
| 2009/0187992 | A1 | 7/2009 | Poston |
| 2010/0011029 | A1 | 1/2010 | Niemelae et al. |
| 2010/0186088 | A1 | 7/2010 | Banerjee |
| 2010/0262873 | A1 | 10/2010 | Chang et al. |
| 2010/0281539 | A1 | 11/2010 | Burns et al. |
| 2011/0023118 | A1 | 1/2011 | Wright |
| 2011/0067106 | A1 | 3/2011 | Evans |
| 2011/0167491 | A1 | 7/2011 | Ruggerio |
| 2011/0231935 | A1 | 9/2011 | Gula et al. |
| 2012/0072983 | A1 | 3/2012 | McCusker et al. |
| 2012/0082061 | A1 | 4/2012 | Lysejko et al. |
| 2012/0082104 | A1 | 4/2012 | Lysejko et al. |
| 2012/0210421 | A1 | 8/2012 | Ormazabal et al. |
| 2012/0284794 | A1 | 11/2012 | Trent et al. |
| 2012/0290829 | A1 | 11/2012 | Altman |
| 2012/0331556 | A1 | 12/2012 | Alperovitch et al. |
| 2013/0006949 | A1 | 1/2013 | Essawi et al. |
| 2013/0073853 | A1 | 3/2013 | Ford |
| 2013/0097699 | A1 | 4/2013 | Balupari et al. |
| 2013/0262655 | A1 | 10/2013 | Deschênes et al. |
| 2013/0326494 | A1 | 12/2013 | Nunez |
| 2014/0157405 | A1 | 6/2014 | Joll et al. |
| 2014/0164251 | A1 | 6/2014 | Loh et al. |
| 2014/0279757 | A1 | 9/2014 | Shimanovsky |
| 2014/0310394 | A1 | 10/2014 | Wood et al. |
| 2015/0052601 | A1 | 2/2015 | White et al. |
| 2015/0120567 | A1 | 4/2015 | Van et al. |
| 2015/0128263 | A1 | 5/2015 | Raugas et al. |
| 2015/0149739 | A1 | 5/2015 | Seo et al. |
| 2015/0304346 | A1* | 10/2015 | Kim ................. H04L 43/04 726/23 |
| 2015/0332283 | A1 | 11/2015 | Witchey |
| 2015/0334125 | A1 | 11/2015 | Bartos |
| 2016/0070911 | A1 | 3/2016 | Okereke |
| 2016/0275288 | A1* | 9/2016 | Sethumadhavan ................. H04L 63/0428 |
| 2016/0299742 | A1 | 10/2016 | Zheng |
| 2016/0366155 | A1 | 12/2016 | El-Moussa et al. |
| 2017/0013000 | A1 | 1/2017 | El-Moussa et al. |
| 2017/0142133 | A1 | 5/2017 | Kallos |
| 2017/0223032 | A1 | 8/2017 | El-Moussa et al. |
| 2017/0337375 | A1 | 11/2017 | Quinlan |
| 2017/0360578 | A1 | 12/2017 | Shin |
| 2018/0025166 | A1 | 1/2018 | Daniel et al. |
| 2018/0115566 | A1 | 4/2018 | Azvine et al. |
| 2018/0115567 | A1 | 4/2018 | El-Moussa et al. |
| 2018/0191751 | A1 | 7/2018 | El-Moussa et al. |
| 2018/0375882 | A1 | 12/2018 | Kallos et al. |
| 2019/0012457 | A1 | 1/2019 | El-Moussa et al. |

FOREIGN PATENT DOCUMENTS

| | | |
|---|---|---|
| WO | WO 2008/091785 A3 | 7/2008 |
| WO | WO 2009/015422 A1 | 2/2009 |
| WO | WO 2009/097610 A1 | 8/2009 |
| WO | WO 2012087685 A1 | 6/2012 |
| WO | WO 2013172750 A1 | 11/2013 |
| WO | WO 2015179020 A2 | 11/2015 |
| WO | WO 2017/109135 A1 | 6/2017 |

OTHER PUBLICATIONS

U.S. Appl. No. 16/065,554, filed Jun. 22, 2018, Inventors: El-Moussa et al.
Application and Filing Receipt for U.S. Appl. No. 15/120,996, filed Aug. 23, 2016, Inventors: El-Moussa et al.
Application and Filing Receipt for U.S. Appl. No. 15/121,008, filed Aug. 23, 2016, Inventors: El-Moussa et al.
Application and Filing Receipt for U.S. Appl. No. 15/121,015, filed Aug. 23, 2016, Inventors: El-Moussa et al.
Application and Filing Receipt for U.S. Appl. No. 15/559,328, filed Sep. 18, 2017, Inventors: Azvine et al.
Application and Filing Receipt for U.S. Appl. No. 15/559,346, filed Sep. 18, 2017, Inventors: El-Moussa et al.
Application and Filing Receipt for U.S. Appl. No. 15/857,163, filed Dec. 28, 2017, Inventors: El-Moussa et al.
Application and Filing Receipt for U.S. Appl. No. 15/319,970, filed Dec. 19, 2016, Inventor: Kallos.
Anonymous, "Can BitCoin be a better DRM? BitcoinBeginners," retrieved from https://www.reddit.com/r/BitcoinBeginners/commentsll y5yh8/can bitcoin_be_a_better drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
International Preliminary Report on Patentability for International Application No. PCT/EP2016/081188 dated Jun. 26, 2018; 6 pages.
International Search Report and Written Opinion for International Application No. PCT/EP2016/081188 dated Jan. 25, 2017; 8 pages.
International Preliminary Report on Patentability for International Application No. PCT/EP2016/082488 dated Jun. 26, 2018; 6 pages.
International Search Report and Written Opinion for International Application No. PCT/EP2016/082488 dated Feb. 10, 2017; 9 pages.
International Search Report and Written Opinion for PCT Application No. PCT/EP2016/055507 dated Jun. 2, 2016, 13 pages.
International Preliminary Report on Patentability for, Application No. PCT/EP2016/055507 dated Sep. 19, 2017, 8 pages.
International Search Report and Written Opinion for PCT Application No. PCT/GB2015/050446, dated May 26, 2015, 13 pages.
International Preliminary Report on Patentability, Application No. PCT/GB2015/050446, dated Sep. 6, 2016, 10 pages.
International Preliminary Report on Patentability for, Application No. PCT/EP2016/055506 dated Sep. 19, 2017, 6 pages.
International Search Report and Written Opinion for PCT Application No. PCT/EP2016/055506 dated May 17, 2016, 9 pages.
Peter Dorfinger et al: "Entropy Estimation for Real-Time Encrypted Traffic Identification (Short Paper)" In: "Field Programmable Logic and Application". Apr. 27, 2011 (Apr. 27, 2011). Springer Berlin Heidelberg. Berlin. Heidelberg. XP055127221. ISSN: 0302-9743 ISBN: 978-3-54-045234-8 vol. 6613. pp. 164-171. DOI: 10.1007/978-3-642-20305-3 14.
Laurent Bernaille et al: "Early Recognition of Encrypted Applications". Apr. 5, 2007 (Apr. 5, 2007). Passive and Active Network Measurement; [Lecture Notes in Computer Science; LNCS]. Springer Berlin Heidelberg. Berlin. Heidelberg. p. 165-175. XP019078570. ISBN: 978-3-540-71616-7 pp. 165-175.

(56) References Cited

OTHER PUBLICATIONS

International Search Report and Written Opinion for PCT Application No. PCT/GB2015/051751 dated Jul. 20, 2015; 9 pages.
International Preliminary Report on Patentability for PCT Application No. PCT/GB2015/051751 dated Dec. 20, 2016; 7 pages.
International Search Report and Written Opinion from PCT Application No. PCT/GB2015/050431, dated May 26, 2015, 12 pages.
International Preliminary Report on Patentability, Application No. PCT/GB2015/050431, dated Sep. 6, 2016, 10 pages.
International Preliminary Report on Patentability, Application No. PCT/GB2015/050444, dated Sep. 6, 2016, 10 pages.
Felix Leder et al: "Proactive Botnet Countermeasures—An Offensive Approache", Proc. of 1st CCDCOE Conference on Cyber Warfare, Jun. 16, 2009 (Jun. 16, 2009), XP055129346, Tallinn, Estonia Retrieved from the Internet: http://www.ccdcoe.org/publications/virtualbattlefield/15_LEDER_Proactive_Coutnermeasures.pdf; 15 pages (retrieved on Feb. 15, 2018).
International Search Report and Written Opinion Application No. PCT/GB2015/050444, dated May 29, 2015, 13 pages.
Common Vulnerability Scoring System, V3 Development Update, First.org, Inc., available at www.first.org/cvss); CVSS v3.0 User Guide (v1.5); 15 pages.
Frigault "Measuring Network Security Using Bayesian Network-Based Attack Graphs" (Marcel Frigault and Lingyu Wang, Jan. 2008, Published in: Computer Software and Applications, 2008. OI: 0.1109/COMPSAC.2008.88 Source: IEEE Xplore); 88 pages.
"Service Name and Transport Protocol Port Number Registry" (Feb. 15, 2018, available from www.iana.org/assignments/service-names-port-numbers/service-names-port-numbers.txt); 411 pages (retrieved on Mar. 6, 2018).
Munoz-Gonzalez "Exact Inference Techniques for the Dynamic Analysis of Bayesian Attack Graphs" (Luis Munoz-Gonzalez, Daniel Sgandurra, Martin Barrere, and Emil Lupu, Oct. 2015); 14 pages.
Jean Goubault-Larrecq and Julien Olivain: "Detecting Subverted Cryptographic Protocols by Entropy Checking", Research Report LSV-06-13, Laboratoire Specification et Verification, Jun. 2006 (Jun. 2006), XP055216893, FR Retrieved from the Internet: http://www.lsv.fr/Publis/RAPPORTS_LSV/PDF/rr-lsv-2006-13.pdf 21 pages (retrieved on Feb. 15, 2018).
Robert Lyda et al: "Using Entropy Analysis to Find Encryted and Packed Malware", Security & Privacy, IEEE, IEEE Service Center, Los Alamitos, CA, US, vol. 5, No. 2, Mar. 2007 (Mar. 2007), pp. 40-45, XP011175986, ISSN: 1540-7993.
Zhang et al, "Detecting Encrypted Botnet Traffic"; Computer Communications Workshops; Computer Science Department, Colorado State University Fort Collins, United States; (INFOCOM WKSHPS), 2013); 6 pages.
H.225 "Call signaling protocols and media stream packetization for packet-based multimedia communication systems" International Telecommunication Union, Dec. 2009 and Amendment 1 dated Mar. 2013, 8 pages.
Haffner et al., "ACAS: Automated Construction of Application Signatures," Proceeding of the 2005 ACM SIGCOMM Workshop on Mining Network Data, Minenet '05 (Aug. 22, 2005), New York, New York, US. 6 pages.
"Entropy", R.L. Dobrushin V.V. Prelov, Encyclopedia of Mathematics, URL: http://www.encyclopediaofmath.org/index.php?title=Entropy&oldid=150999; Springer, 2002, ISBN 1402006098; 2 pages (retrieved on Feb. 15, 2018).
Chen et al., "Spatial-Temporal Modeling of Malware Propagation in Networks", IEEE Transactions on Neural Networks, vol. 16, No. 5, Sep. 2005, 13 pages.
Braden, R.; Internet Protocol Suite RFC1122; Internet Engineering Task Force, Oct. 1989; "Requirements for Internet Hosts-Communication Layers", https://tools.ietf.org/html/rfc1122; 116 pages (retrieved on Feb. 15, 2018).
ITU-T H.323 Series H: Audiovisual and Multimedia Systems Infrastructure of Audiovisual Services—Systems and terminal equipment for audiovisual services. "Packed-based multimedia communications systems", Amendment 1: Use of Facility message to enable call transfer; dated Mar. 2013, 6 pages.
International Telecommunication Union H.245 Series H: Audiovisual and Multimedia Systems Infrastructure of Audiovisual Services—Communication procedures "Control protocol for multimedia communication", May 2011, 348 pages.
"Fast Feature Selection Using Fractal Dimension" (Traina et al, 2000); 16 pages.
ITU-T Telecommunication Standardization Sector of ITU; Series H.235.0 to H.235.7, H.323 Security: Framework for Security in ITU-T H-series (ITU-T H.323 and other ITU-T H.245-based) Multimedia Systems; International Telecommunication Union, Sep. 2005 and Jan. 2014, 296 pages.
Shannon "A Mathematical Theory of Communication" (C.E. Shannon, The Bell System Technical Journal, vol. 27, pp. 379-423, 623-656, July. Oct. 1948; 55 pages.
ITU-T H. 225.0 Dec. 2009 Series H: Audiovisual and Multimedia Systems Infrastructure of Audiovisual Services—Transmission Multiplexing and Synchronization; "Call Signaling Protocols and Media Stream Packetization for Packet-Based Multimedia Communication Systems" 196 pages.
Bestuzhev, Dmitry, "Steganography or Encryption in Bankers?" Nov. 10, 2011; 3 pages (retrieved on Feb. 15, 2018) https://securelist.com/steganography-or-encryption-in-bankers-11/31650/.
Lall et al., "Data Streaming Algorithms for Estimating Entropy of Network Traffic," SIGMETRICS/Performance 2006, Jun. 26-30, Saint Malo, France. 12 pages.
ITU-T Telecommunication Standardization Sector H.225/Q931 Amendment 1 (Dec. 2002) Series Q: Switching and Signaling Digital Subscriber Signaling System No. 1—Network Layer; ISDN User-Network Interface Layer 3 Specification for Basic Call Control; Amendment 1: Extensions for the support of digital multiplexing equipment; Printed Switzerland, Geneva 2003. 26 pages.
Davis, Tom; Guidance Software |Whitepaper; "Utilizing Entropy to Identify Undetected Malware"; Tom Davis, Product Manager, Cybersecurity Solutions; 2009; 11 pages.
Guiling Li—et al Fractal-based Algorithm for Anomaly Pattern Discovery on Time Series Stream Journal of Convergence Information Technology. vol. 6. No. 3. Mar. 31, 2011 (Mar. 31, 20111). pp. 181-187. XP055254814. KP ISSN: 1975-9320. DOI: 10.4156jcit.vol6.issue3.20.
Olshausen, et al., "Sparse Coding with an Overcomplete Basis Set, A Strategy Employed by VI?" Olshausen, B.A., Field, D.J., 1997, Vision Research, 37:3311-3325) retrieved on Mar. 28, 2018 from http://www.chaos.gwdg.de/michael/CNS course_2004/papersmax/OlshausenField1997.pdf, Dec. 24, 1996, 15 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
Adler M., "Threat Intelligence Visibility—the Way Forward," BT, 2015, available from www.globalservices.bt.com/uk/en/products/assure threat_monitoring.
Miller A., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.
"A Next-Generation Smart Contract and Decentralized Application Platform" Ethereum White Paper, 2016, retrieved from https://github.com/ethereum/wiki/wiki/White-Paper.
Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.
Ahmad S., et al., "Real-Time Anomaly Detection for Streaming Analytics," available from Cornell University Library (citation

(56) References Cited

OTHER PUBLICATIONS arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.

Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.

Antonopoulos A M., "Mastering Bitcoin—Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.

Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.

Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.

Tschorsch F., et al., "Bitcoin and Beyond: A Technical Survey on Decentralized Digital Currencies," International Association for Cryptologic Research, May 15, 2015, pp. 1-37.

Wang Z., "The Applications of Deep Learning on Traffic Identification," 2015.

Wikipedia, "Block chain (database)—Wikipedia, the free encyclopedia", Nov. 29, 2015, retrieved from the Internet: URL: https://en.wikipedia.org/w/index.php?title=Block_chain_(database)&oldid=692921608.

Rosenfeld M., "Overview of Colored Coins," https:1/bravenewcoin.com/assets/Whitepapers/Overview-of-Colored-Coins.pdf, Dec. 4, 2012, 13 pages.

Assia Y., et al., "Colored Coins Whitepaper," 2015, available at docs.google.com/document/d/1AnkPcVZTCMLizw4DvsW6M8Q2JCOllzrTLuoWu2zlBE, 23 pages.

Benders J.F., "Partitioning Procedures for Solving Mixed Variables Programming Problems," 1962, vol. 4, pp. 238-252.

Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.

Biryltkov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.

Bonneau J., et al., "Research Perspectives and Challenges for Bitcoin and Cryptocurrencies," International Association for Cryptologic Research, Mar. 19, 2015, 18 pages.

Chaisiri, "Optimization of Resource Provisioning Cost in Cloud Computing," IEEE Transactions on Services Computing, Apr.-Jun. 2012, vol. 5 (2), 14 pages.

Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.

Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.

Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.

Czepluch J.S., et al., "The Use of Block Chain Technology in Different Application Domains," XP055242451, retrieved from http://http://www.lollike.org/bachelor.pdf, May 20, 2015, 109 pages.

Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.

Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.

Hawkins, et al., in "On Intelligence, How a New Understanding of the Brain Will Lead to the Creation of Truly Intelligent Machines," Times Books, ISBN 0-8050-7456-2, 2004, Jul. 14, 2005; 174 pages.

Hawkins, et al., "Why Neurons Have Thousands of Synapses, A Theory of Sequence Memory in Neocortex," Published in Frontiers in Neural Circuits (10 (2016) 1-13, doi:10.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.

Plohmann D., et al., "Case study of the Miner Botnet", Cyber Conflict (CYCON), 2012 4th International Conference on Jun. 5, 2012, pp. 1-16.

Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.

Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.

Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.

Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.

Numenta, "Hierarchical Temporal Memory including HTM Cortical Learning Algorithms," Version 0.2.1, Numenta, Sep. 12, 2011, 68 pages.

Numenta, "Sparse Distributed Representations," Numenta, available from https://numenta.com/assets/pdf/biological-and-machine-intelligence/BaMISDR.pdf and accessed on Mar. 29, 2017, retrieved on Mar. 28, 2018, 15 pages.

International Search Report and Written Opinion for PCT Application No. PCT/EP2016/081187 dated Feb. 21, 2017; 8 pages.

International Preliminary Report on Patentability for PCT Application No. PCT/EP2016/081187 dated Jun. 26, 2018; 6 pages.

\* cited by examiner

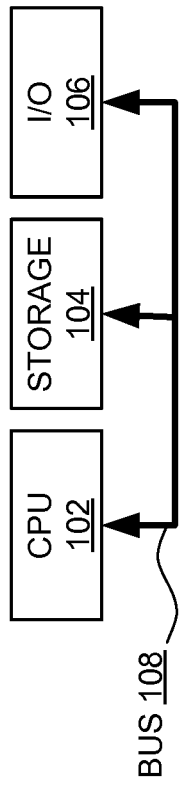
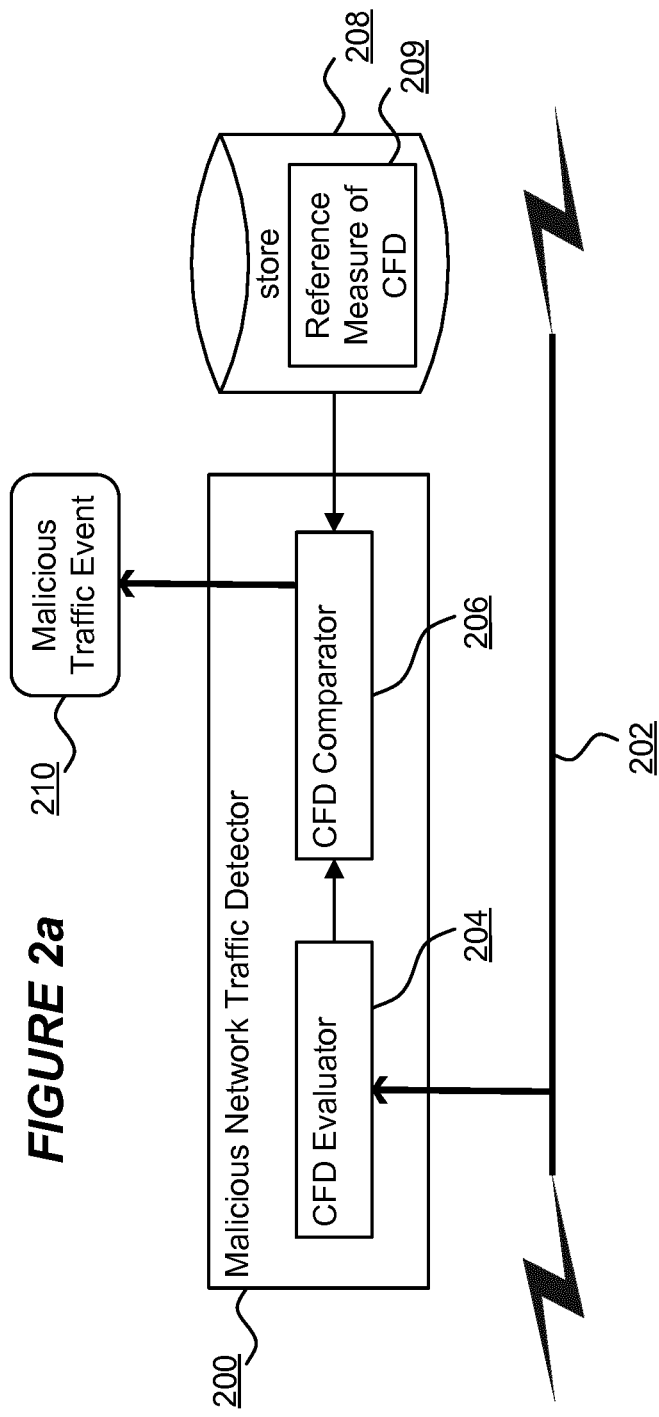

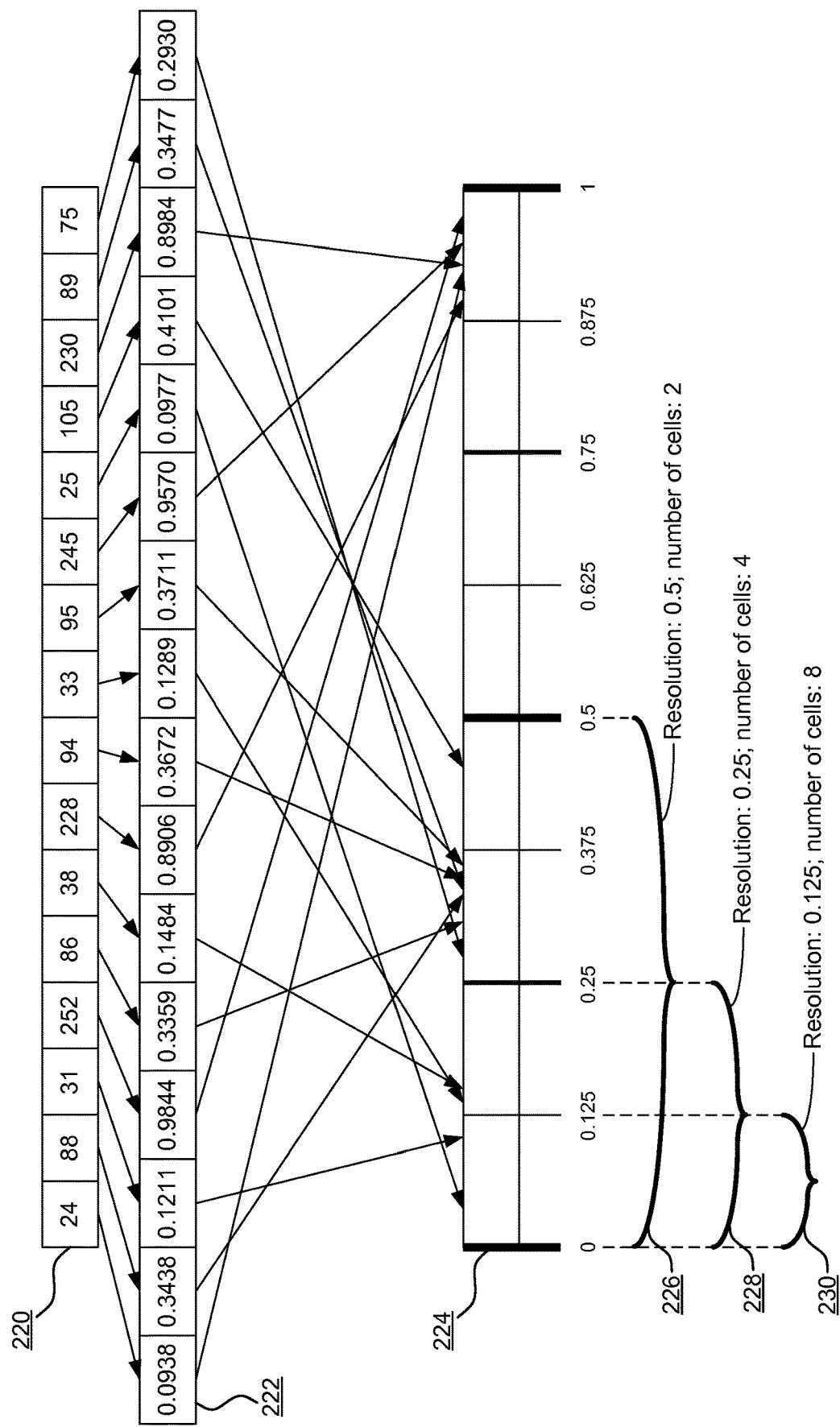

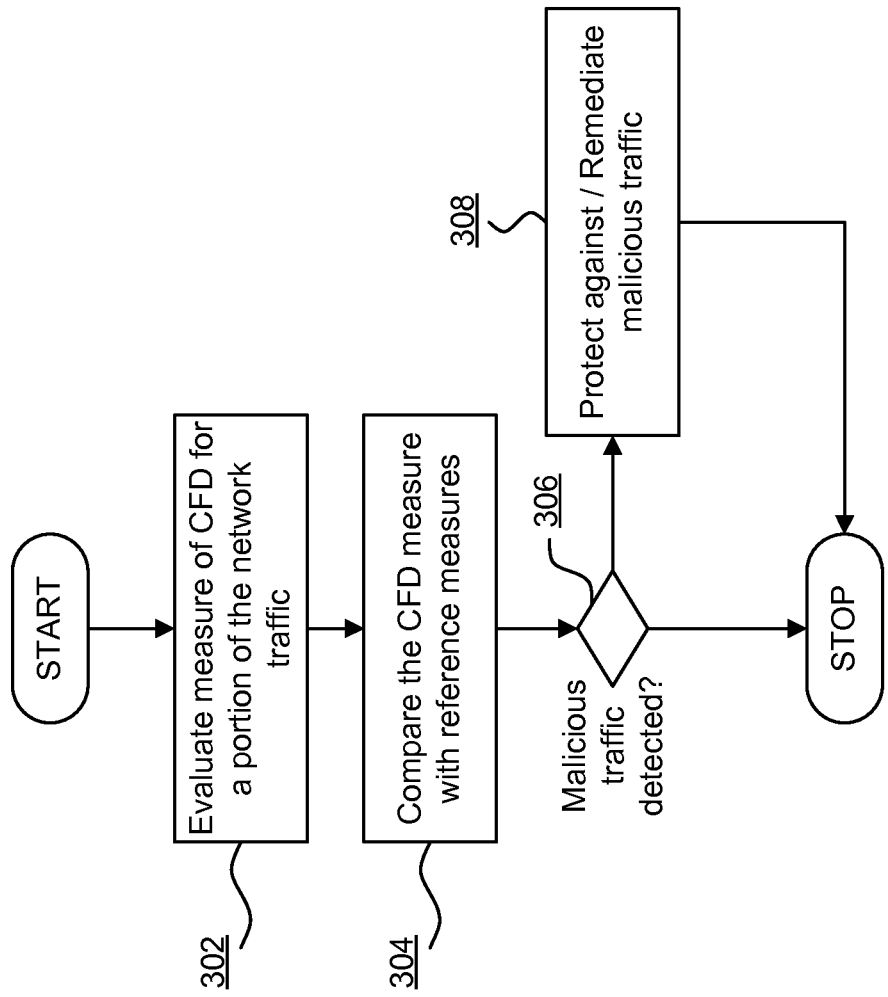

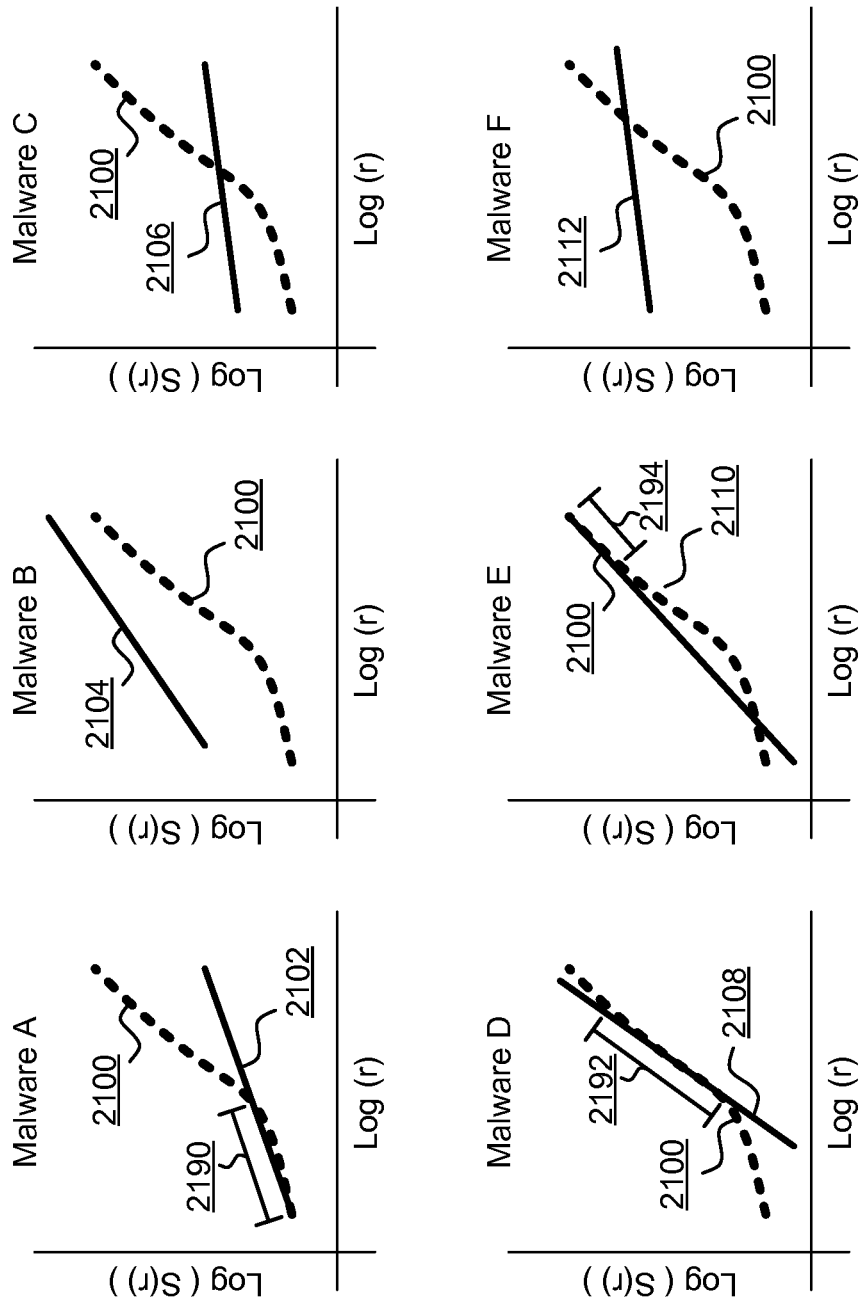

MALICIOUS NETWORK TRAFFIC IDENTIFICATION

CROSS-REFERENCE TO RELATED APPLICATION

The present application is a National Phase entry of PCT Application No. PCT/EP2016/082488, filed Dec. 22, 2016, which claims priority from EP Patent Application No. 15202736.3, filed Dec. 24, 2015, each of which is hereby fully incorporated herein by reference.

TECHNICAL FIELD

The present disclosure relates to the detection of malicious network communications. In particular, the disclosure relates to improved malicious network traffic detection.

BACKGROUND

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Malware proliferation can occur in a number of ways. Malware can be communicated as part of an email such as an attachment or embedding. Alternatively malware can be disguised as, or embedded, appended or otherwise communicated with or within, genuine software. Some malware is able to propagate via storage devices such as removable, mobile or portable storage including memory cards, disk drives, memory sticks and the like, or via shared or network attached storage. Malware can also be communicated over computer network connections such as the internet via websites or other network facilities or resources. Malware can propagate by exploiting vulnerabilities in computer systems such as vulnerabilities in software or hardware components including software applications, browsers, operating systems, device drivers or networking, interface or storage hardware.

A vulnerability is a weakness in a computer system, such as a computer, operating system, network of connected computers or one or more software components such as applications. Such weaknesses can manifest as defects, errors or bugs in software code that present an exploitable security weakness. An example of such a weakness is a buffer-overrun vulnerability, in which, in one form, an interface designed to store data in an area of memory allows a caller to supply more data than will fit in the area of memory. The extra data can overwrite executable code stored in the memory and thus such a weakness can permit the storage of malicious executable code within an executable area of memory. An example of such malicious executable code is known as "shellcode" which can be used to exploit a vulnerability by, for example, the execution, installation and/or reconfiguration of resources in a computer system. Such weaknesses, once exploited, can bootstrap a process of greater exploitation of a target system.

The effects of malware on the operation and/or security of a computer system lead to a need to identify malware in a computer system in order to implement protective and/or remedial measures. Malware propagated by, or communicating over, a network connection, such as the internet, by exploitation of a vulnerability in a target system can be particularly challenging to detect. Many systems monitor files stored or received in a file system with reference to a dictionary of malware "signatures". A signature can be a pattern of data associated with known malware. Such an approach requires the receipt of known malware and is susceptible to subtle changes in malware which may render the malware undetectable in view of the stored signatures. Other systems monitor behavior of software to identify suspicious behavior in order to detect potential malware. Such systems therefore detect malware infection after-the-event and are susceptible to changes in malware and malware devised specifically to minimize suspicious behavior such as malware designed to behave like genuine software.

An alternative approach to the detection of malware is to detect network traffic associated with malware propagated by, or communicating over, a network connection. Such network traffic can be considered malicious network traffic occurring as part of network communications received by, or occurring between, computer systems, such as traffic attributable to malware software installed, being installed or being communicated for installation on a computer system. Traditional malicious traffic detection mechanisms depend on techniques including network traffic interception and analysis or network connection summarization which can determine key characteristics of a network connection such as source and destination addresses, source and destination ports and a protocol (known as a traffic characterizing 5-tuple). Such facilities are provided by technologies such as NetFlow (Cisco) or Yet Another Flowmeter (YAF). With these approaches, detection of malicious communication depends on an analysis of network traffic (or a summarization of traffic) to identify known characteristics of malicious traffic, such as known server addresses, protocols and/or port combinations. Such approaches are of limited effectiveness since it is not always possible to distinguish malicious traffic from non-malicious traffic without also referring to the contents of packets of network traffic by deep packet inspection (DPI) using tools such as BotHunter. BotHunter uses DPI to search for specific patterns in network traffic to detect executable downloads or signature strings associated with known malware.

However, DPI is inefficient since it involves a considerable processing overhead and challenges exist maintaining a DPI process that can keep up with ever greater network throughput. Additionally, DPI is ineffective where malicious network traffic is encrypted. The paper "Detecting Encrypted Botnet Traffic" (Zhang et al., Computer Communications Workshops (INFOCOM WKSHPS), 2013) acknowledges how detection systems such as BotHunter suffer significantly in the presence of encrypted traffic with detection rates reduced by almost 50%. Zhang et al. describes an approach using BotHunter to detect encrypted malicious traffic. The approach of Zhang et al. operates on the premise that the presence of at least one high entropy flow along with other features that BotHunter detects is a reliable detector of encrypted malicious traffic. In information theory, entropy is a measure of a degree of indeterminacy of a random variable ("Entropy", R. L. Dobrushin V. V. Prelov, Encyclopedia of Mathematics, Springer, 2002, ISBN 1402006098). The theoretical basis for entropy calculation and the entropy of an information source is defined in detail in "A Mathematical Theory of Communication" (C. E. Shannon, The Bell System Technical Journal, Vol. 27, pp.

379-423, 623-656, July, October, 1948) and derives from a measure of entropy as defined in statistical mechanics. Zhang describes estimating a measure of entropy for packets in a network communication. Estimates of entropy for a communication exceeding a threshold are identified as "high entropy" and an identification of a high entropy flow contributes to a detection of encrypted malicious traffic.

Zhang is premised on the detection of high entropy flows as an indicator of malicious network traffic. Encrypted network traffic also arises as part of non-malicious applications such as traffic from genuine and/or authorized software applications being encrypted for security purposes. It is therefore problematic to detect and respond to high entropy flows where non-malicious traffic may be falsely identified as potentially malicious.

The paper "Detecting Subverted Cryptographic Protocols by Entropy Checking" (J. Olivain and J. Goubault-Larrecq, 2006) describes an approach to detecting attacks based on computing entropy for a flow. The approach of Olivain et al. is directed to the detection of unscrambled traffic over cryptographic protocols as a way of detecting potentially malicious traffic. In particular, Olivain et al. observe how a measure of entropy for encrypted network traffic will tend towards the entropy of a random source such that, where network traffic consists of characters as bytes from an alphabet of 256 bytes, the entropy of encrypted network traffic tends towards 8 bits per byte. On this basis, Olivain et al. propose an approach to malicious traffic detection based on ranges of acceptable measures of entropy tending towards the entropy of a random source such that traffic that does not tend consistently in this way is identified as being unscrambled and malicious. Olivain et al. acknowledge the considerable drawback of their technique that it can be countered by malicious traffic that is itself encrypted. This is because encrypted malicious traffic will also exhibit entropy tending towards the entropy of a random source and so becomes indistinguishable from non-malicious encrypted traffic.

Bestuzhev highlights how malware can be communicated in encrypted form causing existing automatic malware detection systems to function incorrectly (Bestuzhev, 2010, www.securelist.com/en/blog/208193235/Steganography_or_encryption_in_bankers, retrieved February 2014). Such encrypted malware would also fail to be detected by the approach of Olivain et al which relies on the communication of unscrambled (e.g. unencrypted) traffic for detection.

Patent publication WO2015/128613A1 discloses a method for identifying malicious encrypted network traffic communicated via a computer network, the method comprising: evaluating an estimated measure of Shannon entropy for a portion of network traffic over a monitored network connection; comparing the estimated measure of entropy with a reference measure of Shannon entropy for a corresponding portion of network traffic of a malicious encrypted network connection so as to determine if malicious encrypted network traffic is communicated over the monitored network connection. While the approach of WO2015/128613A1 is effective for encrypted network traffic, it is restricted to substantially the portion of a network traffic that is not encrypted since an estimate of a Shannon entropy measure for encrypted traffic will tend towards entropy of a random source. It would be beneficial to be able to characterize both unencrypted and encrypted network traffic for malicious traffic detection.

SUMMARY

Thus there is a need to address the considerable disadvantages of the known techniques to provide for the detection of malicious traffic.

The present disclosure accordingly provides, in a first aspect, a computer implemented method to identify malicious network traffic communicated via a computer network, the method comprising: evaluating a measure of a correlation fractal dimension for a portion of network traffic over a monitored network connection; comparing the measure of correlation fractal dimension with a reference measure of correlation fractal dimension for a corresponding portion of network traffic of a malicious network connection so as to determine if malicious network traffic is communicated over the monitored network connection.

In some embodiments, in response to a determination that malicious network traffic is communicated over the monitored network connection, triggering a protective component to protect an endpoint of the network connection from the malicious network traffic.

In some embodiments the protective component is operable to undertake one or more of: terminating the network connection; initiate a scan for malware installed at an endpoint computer system; and adapt a level of security of an endpoint computer system or network connection.

The present disclosure accordingly provides, in a second aspect, a malicious network traffic detector connected to a computer network, the detector comprising: a correlation fractal dimension (CFD) evaluator; a CFD comparator; a store storing a reference measure of CFD of a portion of network traffic of a malicious network connection, wherein the evaluator is adapted to evaluate a measure of CFD for a corresponding portion of network traffic communicated over the computer network, and the comparator is adapted to compare the evaluated measure of CFD with the reference measure so as to determine if malicious network traffic is communicated over the network connection.

In some embodiments the method further comprises: a protective component adapted to undertake one or more of: terminating the network connection; initiate a scan for malware installed at an endpoint computer system of the network connection; and adapt a level of security of an endpoint computer system or network connection, wherein the protective component is reactive to a determination of the estimator that malicious network traffic is communicated over the network connection.

The present disclosure accordingly provides, in a third aspect, a method to identify malicious network traffic communicated via a network between a first and second computer system, the method comprising: monitoring network traffic over the network to detect a network connection as a new network connection; identifying characteristics of the network connection to determine a protocol of the network connection; retrieving a definition of a portion of network traffic for a network connection based on the determined protocol; evaluating a measure of correlation fractal dimension (CFD) for a portion of network traffic of the new network connection based on the retrieved definition; comparing the evaluated measure of CFD with a dictionary of one or more CFD measures, each of the one or more CFD measures being associated with a portion of network traffic of a malicious network connection, so as to determine if malicious network traffic is communicated over the network connection.

In some embodiments the portion of network traffic is a continuous subset of the network traffic subsequent to a transport protocol handshake and up to a predetermined endpoint.

In some embodiments the predetermined endpoint is selected to correspond to an end of an application protocol connection setup portion of network traffic.

In some embodiments the method further comprises in response to a determination that malicious network traffic is communicated over the monitored network connection, triggering a protective component to protect an endpoint of the network connection from the malicious network traffic.

In some embodiments the protective component is operable to undertake one or more of: terminating the network connection; initiate a scan for malware installed at an endpoint computer system; and adapt a level of security of an endpoint computer system or network connection.

In some embodiments the portion of network traffic is defined such that an evaluated measure of CFD of the portion of malicious network traffic for a malware network communication substantially distinguishes the malware network communication from non-malware network communication.

In some embodiments the network connection is provided via a transmission control protocol (TCP) connection, and the portion is defined to be a continuous subset of traffic occurring over the network connection subsequent to a TCP handshake portion and up to a point in a flow of network traffic on the network connection where the traffic is substantially all encrypted.

In some embodiments each of the one or more CFD measures in the dictionary is a range of CFD values, and the determination that malicious traffic is communicated over the network connection is based on a determination that the evaluated measure of CFD falls in a range of CFD values in the dictionary.

In some embodiments each of the one or more CFD measures in the dictionary is determined based on an evaluation of an evaluated measure of CFD for a connection setup portion of known malicious network traffic.

The present disclosure accordingly provides, in a fourth aspect, a malicious network traffic detector connected to a computer network, the detector comprising: a monitor adapted to monitor network traffic over the network to detect a network connection as a new network connection; an analyzer adapted to identify characteristics of the network connection to determine a protocol of the network connection; a traffic portions definitions store adapted to store, for each of one or more network protocols, a definition of a portion of network traffic for a network connection; a correlation fractal dimension (CFD) evaluator adapted to evaluate a measure of CFD for a portion of network traffic of a new network connection, the portion being identified from the traffic portions definitions store based on a protocol determined by the analyzer; a dictionary data store storing a dictionary of one or more CFD measures, each of the one or more CFD measures being associated with a portion of network traffic of a malicious network connection; and a CFD comparator adapted to compare the evaluated measure of CFD with at least one CFD measure in the dictionary so as to determine if malicious network traffic is communicated over the network connection.

In some embodiments the identified portion of network traffic is a continuous subset of the network traffic subsequent to a transport protocol handshake and up to a predetermined endpoint.

In some embodiments the predetermined endpoint is selected to correspond to an end of an application protocol connection setup portion of network traffic.

In some embodiments the method further comprises a protective component adapted to undertake one or more of: terminating the network connection; initiate a scan for malware installed at an endpoint computer system of the network connection; and adapt a level of security of an endpoint computer system or network connection, wherein the protective component is reactive to a determination of the comparator that malicious network traffic is communicated over the network connection.

In some embodiments the identified portion of network traffic is defined such that an evaluated measure of CFD of the portion of malicious network traffic for a malware network communication substantially distinguishes the malware network communication from non-malware network communication.

In some embodiments the network connection is provided via a transmission control protocol (TCP) connection, and the identified portion is defined to be a continuous subset of traffic occurring over the network connection subsequent to a TCP handshake portion and up to a point in a flow of network traffic on the network connection where the traffic is substantially all encrypted.

In some embodiments each of the one or more CFD measures in the dictionary is a range of CFD values, and the determination of the CFD comparator that malicious traffic is communicated over the network connection is based on a determination that the evaluated measure of CFD falls in a range of CFD values in the dictionary.

In some embodiments each of the one or more CFD measures in the dictionary is determined based on an evaluation of a measure of CFD for a connection setup portion of known malicious network traffic.

The present disclosure accordingly provides, in a fifth aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 1 is a block diagram of a computer system suitable for the operation of embodiments of the present disclosure.

FIG. 2a is a component diagram of a malicious network traffic detector in accordance with an embodiment of the present disclosure.

FIG. 2c is a schematic illustration of processing of a sequence of bytes of network traffic to evaluate a measure of CFD in accordance with an embodiment of the present disclosure.

FIG. 3 is a flowchart of a method of the malicious network traffic detector of FIG. 2a in accordance with an embodiment of the present disclosure.

FIG. 22 depicts the comparison of an illustrative CFD slope for a new malware with a CFD slope for each of a plurality of known malware in accordance with an embodiment of the present disclosure.

DETAILED DESCRIPTION OF THE DRAWINGS

Figure 2B:
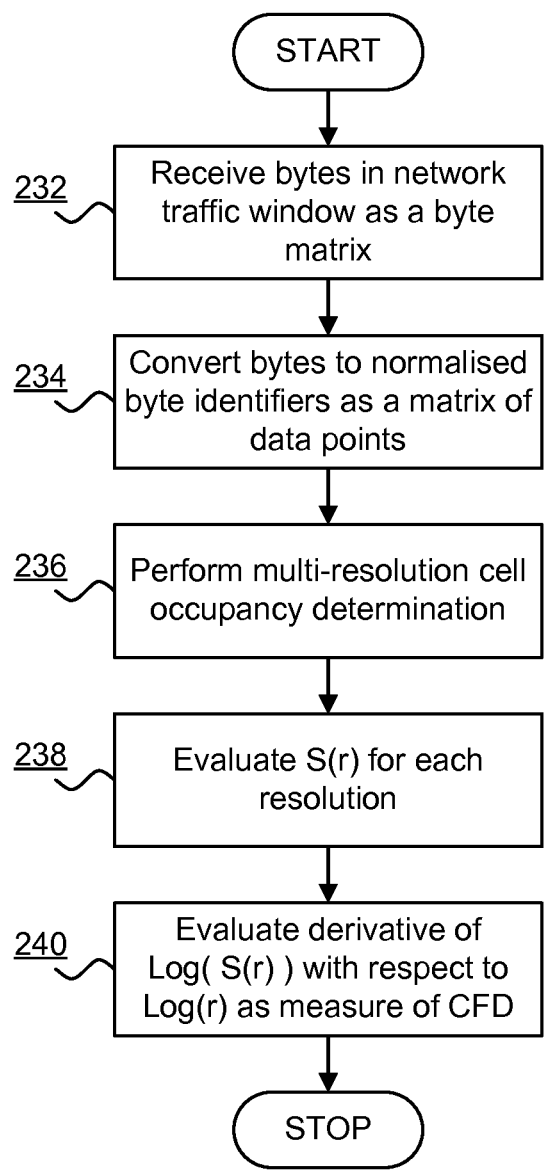
FIG. 2b is a flowchart of an exemplary method of the CFD evaluator 204 of FIG. 2a in an embodiment of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

FIG. 2a is a component diagram of a malicious network traffic detector 200 in accordance with an embodiment of the present disclosure. The detector 200 is a software, hardware or firmware component for monitoring network traffic communicated via a computer network 202 and for generating a malicious traffic event 210 on detection of malicious traffic. The network 202 is a wired or wireless network suitable for the communication of information such as data as network traffic between or within computer systems. Such computer systems can include network connected devices having means to transmit and/or receive data via such a computer network 202 such as, inter alia, pervasive devices, smartphones, embedded logic in devices, appliances, vehicles or other articles, networks of computer systems, mainframe, mini, desktop, portable or cloud-based computer systems, virtualized or emulated systems and the like.

Network traffic is communicated via the network connection 202 between network endpoints such as computer systems. Each communication between endpoints is part of a network connection, such as a Transmission Control Protocol (TCP) connection in the Internet Protocol Suite. For example, a network connection can be characterized by an address of a source network endpoint, an address of a destination network endpoint, source and destination ports for the communication and a type of communication protocol employed.

The detector 200 can be implemented in a network appliance such as a router, switch, firewall, network attached storage, multiplexor, transceiver or the like. Alternatively, the detector 200 can be a standalone device operable with the network 202. In a further alternative, the detector 200 can be provided as a software, hardware or firmware component of a network connected computer system such as a computer system for protection from malicious network traffic and/or malware. For example, the detector 200 can be implemented as part of an intrusion detection system, firewall, operating system, virus detection system, malware detection system or the like.

The detector includes a correlation fractal dimension (CFD) evaluator 204 and a CFD comparator 206 as software, hardware or firmware components. The CFD evaluator 204 is operable to evaluate a measure of CFD for a portion of network traffic communicated over a network connection via the computer network 202. The measure of CFD is evaluated as a measure of a probability that two points in a data stream of information communicated via the network connection 202 will be within a certain distance of each other. The portion of network traffic for CFD evaluation is selected as a continuous subset of the network traffic as a window of network traffic substantially corresponding to an application protocol connection setup. That is, the portion of network traffic substantially corresponds to a portion of the network traffic involved in the formation of a connection for an application network protocol between two application endpoints communicating via the network 202, as will be described in detail below.

A fractal dimension is a mathematical or numerical description of the self-similarity of a structure. The evaluation of a fractal dimension for a given set of data items is described in "Fast Feature Selection Using Fractal Dimension" (Traina et al, 2000) which describes a fractal dimension algorithm. Such an algorithm can be applied to a time series stream as described in "Fractal-Based Algorithm for Anomaly Pattern Discovery on Time Series Stream" (Li et al, Journal of Convergence Information Technology, Volume 6, Number 3, March 2011). Embodiments of the present disclosure apply a CFD to computer network traffic and, in particular, to the identification of malicious network traffic.

A CFD, $D_2$, is evaluated using the formula:

$$D_2 \equiv \frac{\partial \log \sum_i p_{r,i}^2}{\partial \log r}, r \in [r_{min}, r_{max}]$$

where $P_{r,i}$ is the occupancy with which data points fall in an $i^{th}$ cell in a matrix of data points having a resolution r. The resolution is the cell size (also known as the 'radius' of a cell). In embodiments of the present disclosure, the cells for evaluation of a measure of CFD are selected to cover a full range of normalized values of network traffic data units in the portion of network traffic, such as normalized byte values, such that a count of a number of bytes (data points) occurring in each cell is determined as an occupancy measure for each cell from which the CFD is evaluated using the above formula. The evaluation is performed based on occupancy measures for a plurality of resolutions and the fractal dimension is evaluated based on a derivative of a function of the occupancy measures with respect to a function of the radius. The evaluation of a measure of CFD will now be considered in detail by way of example only with reference to FIGS. 2b, 2c and 2d.

FIG. 2b is a flowchart of an exemplary method of the CFD evaluator 204 of FIG. 2a in an embodiment of the present disclosure. To be read in conjunction with FIG. 2b, FIG. 2c is a schematic illustration of processing of a sequence of bytes of network traffic 220 to evaluate a measure of CFD in accordance with an embodiment of the present disclosure. Initially, at 232, the CFD evaluator 204 receives bytes of network traffic in a network traffic window as a byte matrix. The network traffic window is a portion of network traffic for evaluation of the CFD measure. The determination and selection of an appropriate portion of network traffic for CFD evaluation will be described in detail later. FIG. 2c illustrates a example sequence of bytes 220 from network traffic, such as known malware network traffic or network traffic for a network communication for identification of malware. The example sequence 220 of bytes in FIG. 2c is sixteen bytes long though other window sizes could alternatively be used. Each byte in the sequence 220 is illustrated by its value ranging from 0 to 255. At 234 the CFD evaluator 204 converts each byte to a normalized byte identifier to generate a matrix of data points 222. Thus, in FIG. 2, each byte value is normalized in the range [0 . . . 1] such that a value of each byte is identified by a unique numeric identifier in the range. The matrix of data points 222 contains a single entry for each byte and constitutes the base data structure for the evaluation of a measure of CFD in this example. At 236 the method performs a multi-resolution cell occupancy determination for the matrix of data points 222. That is, for each of a plurality of resolutions r, cell occupancy counts are determined. Each resolution is a subdivision of the entire normalized range for the data points in the matrix 222. The normalized range of [0 . . . 1] is thus subdivided into equally sized cells depending on each resolution. Formally:

$$R = \frac{1}{2^j}$$

where $j = 1, 2 \ldots l$

Thus FIG. 2c includes a conceptual depiction of the normalized range [0 . . . 1] divided into cells as a cell matrix 224. The normalized range in FIG. 2c is subdivided into cells at each of three different resolutions though different numbers of resolutions (at least 2) can be employed. Thus, where r=0.5 there are two cells including a cell for normalized values up to 0.5 and a cell for normalized values greater than or equal to 0.5 (depicted at 226). Where r=0.25 there are four cells including: a cell for normalized values up to 0.25; a cell for normalized values greater than or equal to 0.25 and less than 0.5; a cell for normalized values greater than or equal to 0.5 and less than 0.75; and a cell for normalized values greater than or equal to 0.75 (depicted at 228). Further, Where r=0.125 there are eight cells including: a cell for normalized values up to 0.125; a cell for normalized values greater than or equal to 0.125 and less than 0.25; a cell for normalized values greater than or equal to 0.25 and less than 0.375; a cell for normalized values greater than or equal to 0.375 and less than 0.5; a cell for normalized values greater than or equal to 0.5 and less than 0.625; a cell for normalized values greater than or equal to 0.625 and less than 0.75; a cell for normalized values greater than or equal to 0.75 and less than 0.875; and a cell for normalized values greater than or equal to 0.875 (depicted at 230). Each of these sets of cells constitutes a resolution or a particular radius (size) of the cells or grid.

The multi-resolution cell occupancy determination at 236 involves counting the cell occupancy for each resolution by mapping the normalized byte values 222 into the cells 224, as depicted by arrows in FIG. 2c. Thus, the cell occupancy for r=0.5 can be summarized as:

| Cell | Count |
|---|---|
| <0.5 | 11 |
| >=0.5 | 5 |

The cell occupancy for r=0.25 can be summarized as:

| Cell | Count |
|---|---|
| <0.25 | 4 |
| >=0.25 and <0.5 | 7 |
| >=0.5 and <0.75 | 0 |
| >=0.75 | 5 |

The cell occupancy for r=0.125 can be summarized as:

| Cell | Count |
|---|---|
| <0.125 | 2 |
| >=0.125 and <0.25 | 2 |
| >=0.25 and <0.375 | 6 |
| >=0.375 and <0.5 | 1 |
| >=0.5 and <0.625 | 0 |
| >=0.625 and <0.75 | 0 |
| >=0.75 and <0.875 | 0 |
| >=0.875 | 5 |

At 238 the method of the CFD evaluator 204 evaluates a value S(r) for each resolution r in accordance with the following formula:

$$S(r) = \sum_i P_{r,i}^2$$

i.e. a sum of squared cell occupancy counts for each cell i=0 . . . n in the cell matrix 224. Subsequently, at 240, the method evaluates a derivative of Log(S(r)) with respect to Log(r) as a measure of CFD for the stream of data bytes 220. The derivative can be evaluated mathematically or by modeling the values of Log(S(r)) with respect to Log(r) such as by plotting on a graph or a logical representation of such a graph. Thus, using the exemplary data of FIG. 2c:

| Resolution (r) | Log (r) | Log (S(r)) | Slope = Log ((S(r))/Log (r)) |
| --- | --- | --- | --- |
| 0.5 | −0.30103 | 2.16435 | −7.18981 |
| 0.25 | −0.60206 | 1.95242 | −3.24290 |
| 0.125 | −0.90309 | 1.84510 | −2.04310 |

Figure 2D:
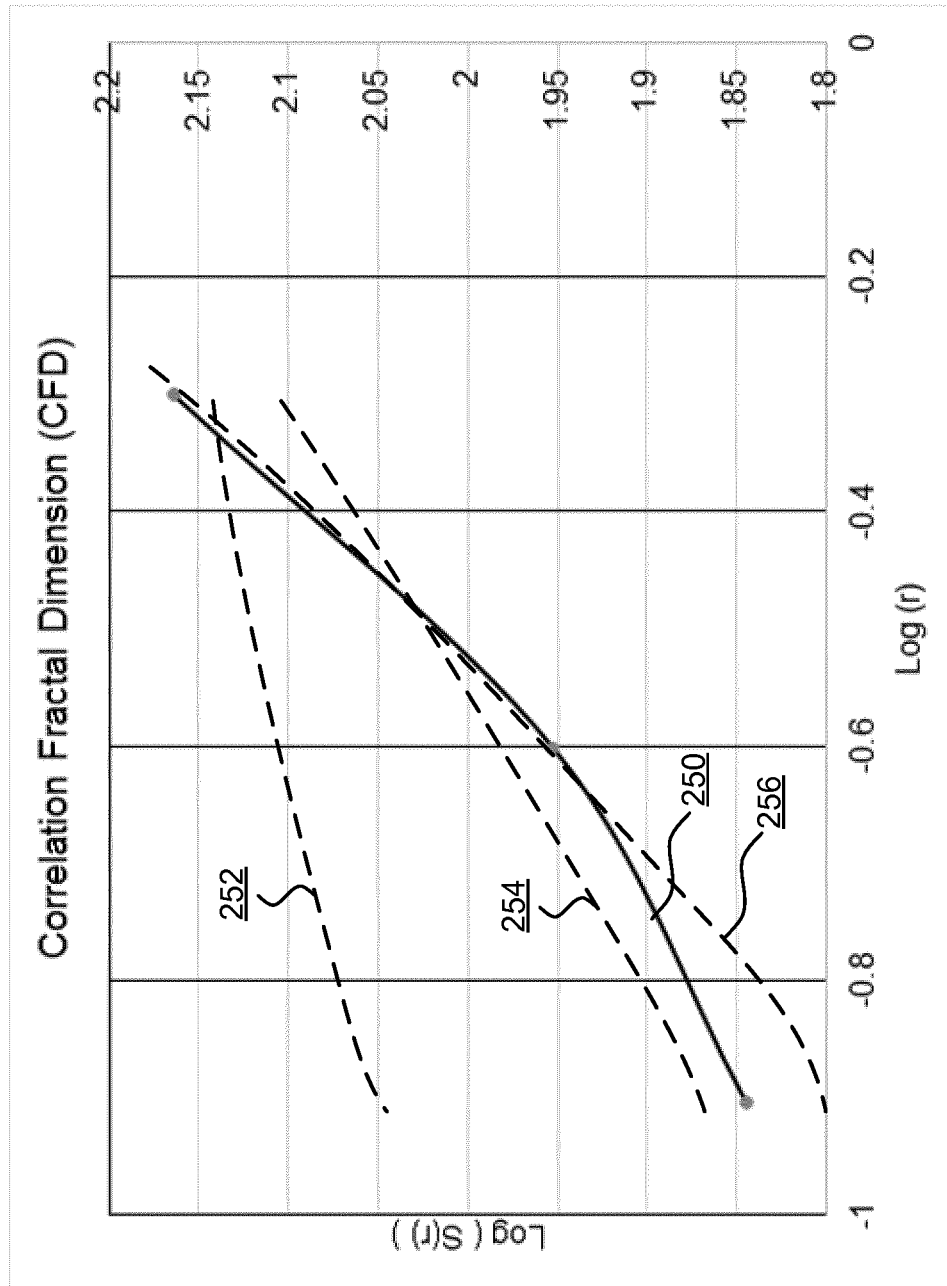
FIG. 2d illustrates a plot of the values of Log(S(r)) with respect to Log(r) for the exemplary data of FIG. 2c in accordance with an embodiment of the present disclosure.

FIG. 2d illustrates a plot 250 of the values of Log(S(r)) with respect to Log(r) for the exemplary data of FIG. 2c in accordance with an embodiment of the present disclosure. The slope or gradient of the plot 250 constitutes a measure of CFD for the data stream 220 and such slope can be evaluated as a generalization, an average, mean or mode gradient or a point linear gradient at a selected point across the range of the plot. Alternatively the slope may be evaluated algorithmically by differentiation. Thus, in this way the method of FIG. 2b evaluates a measure of CFD for a portion of network data 220.

FIG. 2d further depicts, by way of example only, further slopes corresponding to plots of values of Log(S(r)) with respect to Log(r) for other sequences of bytes for the purpose of illustrating an exemplary mode of operation of the CFD comparator 206 in accordance with an embodiment of the present disclosure. Slope 252 can be seen to have little commonality with slope 250 while slopes 254 and 256 have greater commonality. The commonality can be determined from a similarity of the slopes—such as a similarity of the gradient of the lines at one, more or a range of values in the plot. A degree of similarity of CFD values can be defined for use by the CFD comparator 206 such as a range, point and deviation or other similarity measure. In can be advantageous to emphasize commonality for parts of a slope corresponding to a relatively greater number of cells in a resolution, such as resolution r=0.125 since this corresponds to a more detailed fractional analysis of the normalized byte values.

Thus the method of the CFD evaluator 204 described above is applicable to a determination of a CFD measure for a window of network traffic. Such CFD measure could apply to known malware network traffic as a reference measure of CFD 209 or alternatively to network traffic for comparison with known malware network traffic, such comparison being achieved based on the CFD measure.

The CFD comparator 206 is operable to receive an evaluated measure of CFD from the CFD evaluator 204 for comparison with a reference measure of CFD 209 in a data store 208. The data store is any suitable data storage mechanism for the storage of the reference measure of CFD 209, such as a data structure, memory area, file, database or the like. While the store 208 is illustrated as being external to the detector 200 it will be apparent to those skilled in the art that the store could alternatively constitute part of the detector 200.

The reference measure of CFD 209 is a measure of CFD for a portion of network traffic of a known malicious encrypted network connection. The reference measure of CFD 209 is predetermined by a suitable mechanism such as through observation of malicious network traffic. For example, malicious network traffic such as network traffic occurring between two malicious software applications communicating via the computer network 202 is monitored to observe a portion of the network traffic and a measure of CFD of the observed portion is evaluated and stored as the reference measure of CFD 209. The reference measure of CFD 209 can be evaluated using the same technique as is employed by the CFD evaluator 204 described above.

Accordingly, in use, the comparator 206 is operable to compare a measure of CFD from the evaluator 204 with the reference measure of CFD 209 for malicious encrypted traffic. In response to a determination, by the comparator 206, that the measure of CFD for traffic communicated via the computer network 202 is sufficiently similar to the reference measure of CFD 209, the comparator 206 outputs a positive identification of malicious traffic on the computer network 202. The sufficiency of the similarity in the CFD measures can be achieved on the basis of a comparison algorithm including a comparison allowing for a degree of deviation based on a predetermined level of acceptable deviation. For example, the reference measure of CFD 209 can define a midpoint in a linear range of CFD measures deviating by a predetermined extent above and below the midpoint. Alternatively, the reference measure of CFD 209 can be a range of reference CFD measures.

On positive determination of malicious traffic by the comparator 206, a malicious traffic event 210 is generated to indicate that malicious traffic is identified on the computer network 202. The malicious traffic event 210 can further include, refer to, or correlate with information identifying any or all of: the network 202; a network connection occurring on the network 202; a protocol of a network connection occurring on the network 202; one or more of the endpoints, such as an address of systems, resources, appliances or entities, engaged in a network connection occurring on the network 202; other characterizing information for a network connection such as ports or session identifiers, and the like. The malicious traffic event 210 can be a consumable event for receipt by one or more components operable to receive the event and act upon the event. For example, the malicious traffic event 210 can trigger a communication to one or both endpoints of a malicious network connection for the purposes of informing the endpoint(s) that malicious communication is in progress. Alternatively, the malicious traffic event 210 can trigger a proactive termination of an identified malicious network connection, or an increase in a standard or level of network or system security employed by an endpoint of the malicious network connection. The malicious traffic event 210 can trigger a virus, malware, or other malicious software or configuration scan of a computer system, or a shutdown, closure or disconnection of a computer system, or any other suitable protective or remedial measures as will be apparent to those skilled in the art and which may depend on the nature, configuration and purpose of a computer system. Thus, in use, the malicious traffic event 210 suitable for triggering a protective component to protect an endpoint of the network connection from the malicious network traffic. The protective component (not illustrated) can be a software, hardware or firmware component operable to undertake one or more of, inter alia: terminating the network connection; initiate a scan for malware installed at an endpoint computer system; and adapt a level of security of an endpoint computer system or network connection.

FIG. 3 is a flowchart of a method of the malicious network traffic detector 200 of FIG. 2a in accordance with an embodiment of the present disclosure. Initially, at 302, the CFD evaluator 204 evaluates a measure of CFD for a portion of network traffic. The portion of network traffic is selected to correspond to a connection setup portion of traffic for an application protocol employed by a network connection on the network 202. At 304 the CFD comparator 206 compares the evaluated measure of CFD with a reference measure of CFD 209.

At 306 detector 200 determines if malicious traffic is detected based on the comparison undertaken at 304. Where malicious traffic is detected, protective and/or remedial measures are taken at 308 in order to protect against the malicious network traffic and/or remediate malicious software operating at one or both of the communication endpoints.

Thus, in accordance with embodiments of the present disclosure, a measure of CFD for a portion of network traffic occurring over a network connection is suitable for characterizing the network traffic for the purpose of comparing with reference measures of CFD for known malicious encrypted network traffic in order to identify malicious traffic. The portion of network traffic is selected as a continuous subset of the network traffic substantially corresponding to an application protocol connection setup. That is, the portion of network traffic substantially corresponds to a subset of the network traffic involved in the establishment of a connection for an application network protocol between two application endpoints. In an embodiment, the portion of network traffic corresponds directly to application protocol connection setup traffic. Application protocols include protocols occurring at the application layer of the Internet Protocol Suite as defined by RFC1122 (RFC 1122, Robert Braden, Internet Engineering Task Force, 1989, available at tools.ietf.org/html/rfc1122). Equivalently, application protocols include protocols occurring at the application, presentation or session layer of the Open Systems Interconnection (OSI) model of network protocols.

The exact nature and extent of an application protocol connection setup will vary for different application protocols and the identification of a part of an application network communication constituting a connection setup will be apparent to those skilled in the art. The connection setup will substantially correspond to a portion of a communication that is consistently required for the setup of communications using the application protocol. Notably, connection setup excludes substantive traffic being traffic for which a network connection is created (i.e. the payload, freight or cargo of a network communication taken as a whole). Even where substantive traffic is encrypted, the highly variable nature of the encrypted substantive traffic resulting from the encryption will still produce a useful measure of CFD. Thus a connection setup portion of traffic is used for the evaluation of a measure of CFD, the connection setup portion consisting of unencrypted and, potentially, encrypted data.

For example, an application protocol for the transmission of multimedia data, such as the H.323 protocol (Packet-Based Multimedia Communications System, the International Telecommunications Union (ITU), 2009 and Amendment 1 dated March 2013, available from www.itu.int/rec/T-REC-H.323) includes a connection setup portion and a substantive portion. The substantive portion of an H.323 communication is that portion including multimedia data communicated via an RTP communication channel (Real-time Transport Protocol)—and being the substantive traffic for which a connection is created. The connection setup portion of an H.323 communication is that portion of network traffic required to establish the network connection in order that the multimedia data can be communicated in a desired manner. Thus, with reference to the use of the H.323 communication for a Voice Over IP (VOIP) communication, the connection setup portion of a communication will include: a H.225/Q931 call setup (ITU, 2009 and Amendment 1 dated March 2013, available from www.itu.int/rec/T-REC-H.225.0); a H.245 negotiation (ITU, 2011, available from www.itu.int/rec/T-REC-H.245); and a H.245 voice path setup for an RTP communication channel. Subsequently, substantive voice data is transmitted over the established RTP channel. Such substantive data can be encrypted involving further connection setup steps, such as in accordance with the H.235 security standard (H.235.0 to H.235.7, ITU, 2005 and 2014, available from www.itu.int).

Figure 4:
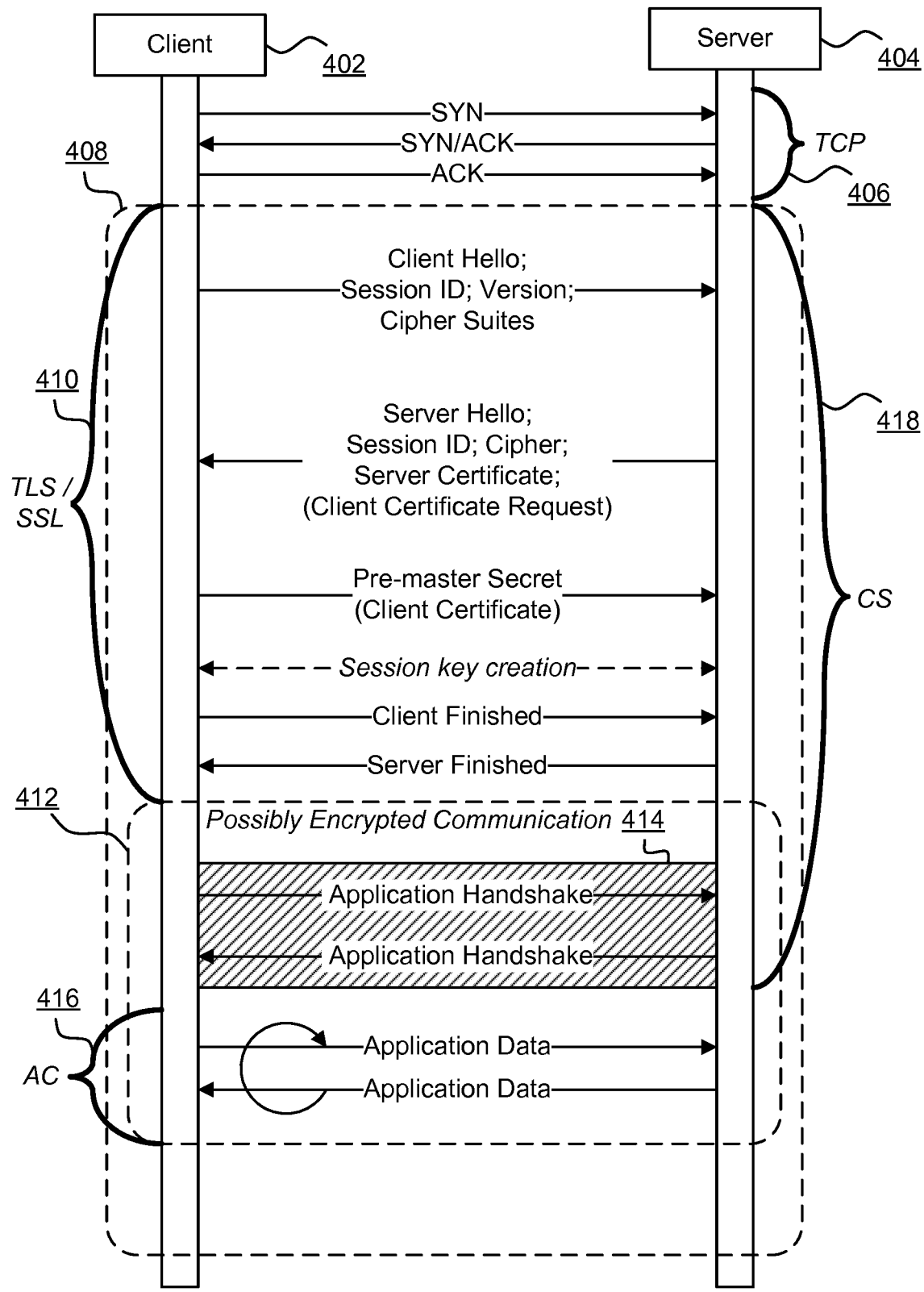
FIG. 4 is an exemplary illustration of the connection setup and communication of data between a client and a server in accordance with an embodiment of the present disclosure.

By way of further example, FIG. 4 is an exemplary illustration of the connection setup and communication of encrypted data between a client 402 and a server 404. The steps indicated at 406 generally relate to the internee's TCP setup including a "SYN," "SYN/ACK" and "ACK" messages. These messages relate to the TCP protocol at the transport layer and serve to establish a TCP connection with segment sequence number synchronization. Following these steps a TCP connection is created between the client 402 and server 404 indicated by the broken line 408. Subsequently, the activities indicated at 410 generally relate to the creation of a potentially encrypted connection, such as an encrypted connection using the Secure Sockets Layer (SSL) or Transport Layer Security (TLS) protocol. As will be familiar to those skilled in the art, the SSL and TLS protocols are cryptographic protocols at the application layer of the Internet Protocol Suite that use asymmetric cryptography to securely establish a symmetric session key for encrypting data communicated between endpoints. Thus, subsequent to the establishment of the secure connection at 410, a secure SSL or TLS session is provided between the client 402 and server 404, as indicated by the broken line 412. Subsequently, an application protocol for exchanging data between software applications executing at each of the client 402 and server 404 is established. Such an application protocol can be a standardized or application specific protocol and can include an initial set of messages for establishing an application protocol connection, referred to in FIG. 4 as an application handshake. Examples of applications protocols include internet protocols such as, inter alia: FTP (file transfer protocol); Telnet; SSH (secure shell); SMTP (simple mail transfer protocol); IMAP (internet message access protocol); POP (post office protocol); SNMP (simple network management protocol); HTTP (hypertext transfer protocol); and CMIP (common management information protocol). Further, applications protocols can include service or application specific protocols such as, inter alia: AFP (Apple filing protocol, formerly AppleTalk); JNDI (Java naming and directory interface); SOAP (simple object access protocol); RDP (remote desktop protocol); NFS (network file system); X Window System; Java remote method protocol; and very many others. Yet further, bespoke application protocols can operate at the application layer such as, inter alia: database access protocols such as Oracle Net; messaging protocols such as Apple iMessage or Google Wave Federation Protocol; voice or media protocols such as the proprietary Skype protocol; cryptocurrency protocols such as BitCoin protocol; and very many others.

A handshake phase of an application protocol can include negotiation, configuration, authentication, further or alternative cryptographic setup, authorization and/or access control, information exchange, parameter configuration, sequencing and the like. Referring again to FIG. 4, following the establishment of a secure SSL/TLS connection an application protocol handshake takes place as indicated by the hatched area 414. In the example of FIG. 4 the application handshake may be encrypted using the session key established for the SSL/TLS session 408. It will be appreciated by those skilled in the art that application protocols could alternatively manage their own cryptographic communications mechanism instead of, or in addition to, an SSL/TLS session 408. The nature and extent of the application handshake 414 will vary depending on the type of application protocol employed and can be protocol specific. Where the protocol specification is public, the nature and extent of the application handshake 414 will be well known.

Subsequent to the application protocol setup 414, an application communications session is established and application data is exchanged between the client 402 and server 404 as indicated generally at 416 "AC" (application communication) in FIG. 4. Thus the application data exchanged at 416 may be encrypted. Where the communicating application has a vulnerability, such as a susceptibility to buffer overflow attack, a programming error, format string vulnerabilities, security lapses or misconfigurations and the like, then the vulnerability is susceptible to exploitation. Exploitation can involve the ultimate execution of arbitrary code by an unauthorized entity such as by way of system access via shellcode or the like. Such exploitation can ultimately lead to the installation of malware on the exploited computer system and, as previously described, when such exploitation takes place over an encrypted network connection such as that illustrated in FIG. 4, the difficulty in identifying such an exploitation increases considerably.

Accordingly, embodiments of the present disclosure evaluate a measure of CFD for a portion of network traffic occurring over a network connection. The portion is selected such that the portion is suitable for characterizing the network traffic for the purpose of comparing with reference measures of CFD for known malicious encrypted network traffic in order to detect malicious encrypted traffic. Monitoring a trend in network traffic, such as is proposed by Olivain et al., is not effective where the network traffic may be encrypted. For example, estimates of Shannon entropy measures for encrypted network traffic will tend towards entropy of a random sample. In contrast, embodiments of the present disclosure evaluate a measure of CFD of a specifically chosen portion of a network communication consisting of the application protocol connection setup. FIG. 4 illustrates such a portion as "CS" 418 (connection setup). It can be seen, in FIG. 4, that portion 418 constitutes a window of network traffic occurring in all the network traffic for the network connection. The connection setup portion of FIG. 4 is defined to include the TLS/SSL negotiation traffic and the application handshake 414. Notably, the application handshake of FIG. 4 may be encrypted. Note further that the TCP connection setup 406 is excluded since this is not an application layer protocol of the Internet Protocol Suite. The TCP connection setup 406 will be largely consistent for all connections save for connection characterizing information such as addresses and ports, and so the value of the TCP connection setup 406 for the evaluation of CFD is low. In some embodiments the TCP connection setup 406 is included in the CFD evaluation since the effect of including the TCP connection setup 406 may, in some embodiments, be considered consistent across all network connections and accordingly becomes self-cancelling for comparison purposes. In some embodiments, however, the TCP and other, similar or alternative lower layer protocols such as transport, internet and link layer protocols, are excluded from the portion of network traffic for the evaluation of CFD. In some embodiments, the identification of a lower layer protocol connection setup, such as the TCP connection setup 406, is used to determine the commencement of an application setup portion of network traffic.

The definition of a portion of network traffic over a network connection for use in evaluating CFD is predetermined and protocol specific. A definition of an application protocol can be used to determine the number and/or size of network segments, packets, messages or the like that suitably constitute the required portion for the protocol. The portion is a continuous and unbroken portion of network traffic relating to the connection setup characteristics in order that malicious traffic can be identified efficiently and ahead-of-time in order that appropriate remediation and/or protection measures can be employed without necessarily acquiescing to malicious communication. Notably, the portion is not disconnected or comprised of selected fields or multiple portions of network traffic—such an approach introduces inefficiencies in both the identification of relevant parts of network traffic and also in the evaluation of a CFD measure. Further, such an approach cannot ensure the efficient and effective application of the CFD evaluation mechanism for streamed network traffic.

It is necessary to ensure that the portion of network traffic used by the CFD evaluator 204 for the evaluation of a CFD measure is consistent with a portion of network traffic used to evaluate the reference measure of CFD 209. That is to say that a portion definition for a protocol of network traffic in a network connection over the network 202 applies equally to the CFD evaluator 204 and the mechanism used to determine the reference measure of CFD 209, which can also be a process of CFD evaluation consistent with that of the evaluator 204. If the portions are not consistent then the opportunity to identify malicious traffic corresponding to the reference measure of CFD 209 are reduced and can be eliminated.

In one embodiment, where a network connection is provided via a TCP connection, the portion of network traffic for evaluation of a CFD measure is determined to be a continuous subset of traffic occurring over the network connection subsequent to a TCP handshake portion and up to a point in a flow of network traffic on the network connection where the traffic is substantially all encrypted. Such a portion can correspond substantially to an application protocol connection setup portion for some protocols.

Figure 5:
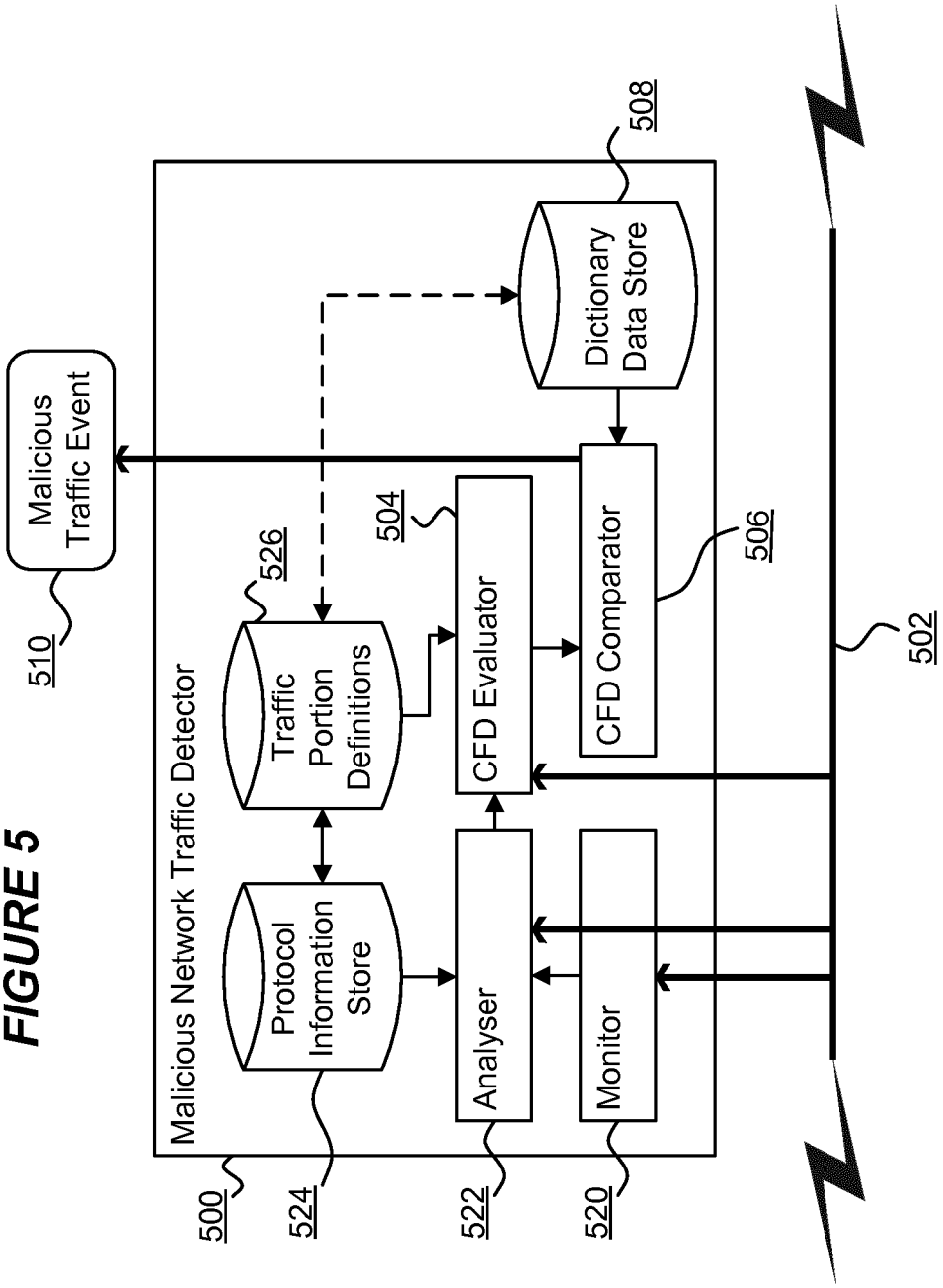
FIG. 5 is a component diagram of a malicious network traffic detector in accordance with an embodiment of the present disclosure.

FIG. 5 is a component diagram of a malicious network traffic detector 500 in accordance with an embodiment of the present disclosure. Many of the features of FIG. 5 are consistent with those of FIG. 2a and these will not be repeated. The detector 500 of FIG. 5 further includes a monitor 520 and analyzer 522 as software, hardware or firmware components.

The monitor 520 is operable to monitor network traffic occurring over the network 502 to identify network connections. In an embodiment, the monitor 520 is operable to identify the commencement of new network connections by identifying known connection setup characteristics of protocols used for communication via the network 502. For example, the monitor 520 can be operable as a network component adapted to a promiscuous mode of operation in which all network traffic passing via the network 502 is accessible to the monitor 520 as a type of network sniffer. In one embodiment, the monitor 520 is adapted to operate in a raw socket mode of operation. For example, the monitor 520 can be implemented using the libpcap library or similar. In use, the monitor 520 identifies new network connections. For example, the monitor 520 can identify the commencement of a TCP connection by identifying the TCP connection setup including "SYN," "SYN/ACK," "ACK" segments. In this way, new network connections created over the network 502 are detected by the monitor 520.

The analyzer 522 is operable to analyze a new network connection identified by the monitor 520 to identify characteristics of the network connection to determine an application protocol of the network connection. The determination of an application protocol is made with reference to a protocol information store 524 storing one or more characteristics of application protocols as one or more criteria. The criteria, when satisfied, are suitable for identifying a protocol of a network connection. In one embodiment, an application protocol for a network connection is determined based on an identification of port numbers for the network connection since port numbers are generally application specific. Internet Protocol Suite ports numbered from 0 to 1023 are designated well-known ports for most widely-used network services. Ports 1024 to 49151 are registered ports assigned by the Internet Assigned Numbers Authority (IANA) for specific services. Some application protocols adopt ports unofficially and through convention and widespread usage become synonymous with their adopted port numbers. A list of ports and associated application protocols is available from IANA as "Service Name and Transport Protocol Port Number Registry" (2014, available from www.iana.org/assignments/service-names-port-numbers/service-names-port-numbers.txt).

In alternative embodiments, further characteristics of the network connection observable by the analyzer 522 can be used to determine the application protocol. For example, unencrypted connection setup information or protocol-specific information, data or headers disclosed as part of the network connection.

Each protocol in the protocol information store 524 has associated one or more portions in the traffic portion definitions store 526. The traffic portion definitions 526 include a definition of a portion of network traffic for the evaluation of a CFD measure by the CFD evaluator 504. As described above, each traffic portion definition 526 identifies a continuous subset of network traffic as a window of network traffic corresponding to an application protocol connection setup portion of network traffic. The traffic portion definitions 526 are predefined and can be based on definitions of application protocols or observation of application protocols in use. In an embodiment, a portion definition 526 includes a definition of an amount of traffic following a TCP connection setup, such as a number of segments, packets, messages or bytes, commencing at a reference starting point in network traffic. Thus, in one embodiment, each portion is a subset of network traffic subsequent to a transport protocol handshake and up to a predetermined endpoint. In an alternative embodiment, a portion definition 526 includes a definition of a starting point, such as a starting byte or segment, in a sequence of network traffic, and a definition of an ending point such as an ending byte or segment or a number of bytes or segments. In one embodiment, each traffic portion definition in the store 926 is protocol specific such that a definition of a portion of traffic is specific to a particular protocol in the protocol information store 924. In all cases the portion is defined to be a continuous, unbroken subset of network traffic defined as some window of network traffic communicated for a network connection. While the protocol information store 524 and traffic portion definitions 526 are illustrated as different and separate data stores, it will be apparent to those skilled in the art that the protocol information and traffic portion definitions can alternatively be stored in a common data store.

The CFD evaluator 504 is adapted to retrieve one or more definitions of a portion of network traffic from the traffic portion definitions 526 based on the protocol for the network traffic determined by the analyzer 522. The evaluator 504 is further adapted to evaluate a measure of CFD for the network connection as a measure of CFD of each portion of traffic for the connection according to the retrieved traffic portion definitions 526. The measure of CFD is evaluated as described above. Where multiple traffic portion definitions 526 are retrieved for a protocol, such portion definitions will constitute windows of network traffic that may overlap or occur adjacent in the flow of network traffic. Thus, the evaluation of a measure of CFD for each of the retrieved traffic portion definition 526 may involve multiple evaluations covering the same network traffic to differing extents: such that evaluations occur for all windows of the traffic constituting each of the retrieved traffic portion definitions 526. In an embodiment this is efficiently achieved by receiving, intercepting, sniffing, recording or otherwise accessing network traffic in a window of network traffic for a connection covering the windows of all retrieved traffic portion definitions 926. Subsequently, individual traffic portion definitions 926 can be applied to the network traffic so accessed in order to undertake CFD evaluations for each portion individually. In such embodiments it is necessary to access the network traffic only once from the network, attending to the evaluation of multiple measures of CFD subsequently.

The CFD comparator 506 is adapted to receive a measure of CFD for the network connection from the evaluator 504 and compare the measure of CFD with CFD measures recorded in a dictionary data store 508. The dictionary data store 508 stores a dictionary of one or more CFD measures, each being associated with a type of malicious communication such as malware or an exploit. The CFD measures in the dictionary 508 are predetermined and can be based on evaluated measures of CFD for known malicious encrypted network traffic. Notably, the CFD measures in the dictionary 508 are evaluated based on a portion of network traffic for a particular application protocol that is consistent with the portion used by the CFD evaluator 504 for a new network connection. Thus, the CFD measures in the dictionary 508 are can be evaluated based on the traffic portion definitions 526 for known malicious encrypted traffic. As described above with respect to the reference measure of CFD of FIG. 2a, the CFD measures in the dictionary 508 can be determinate measures, ranges of measures, or measures from which some degree of deviation is permitted to identify similarity of measures. Known malicious encrypted network traffic includes network traffic known to contain malicious encrypted payload, such as network traffic delivering encrypted malware. Further, known malicious encrypted network traffic includes encrypted network traffic known to relate to communications from a malicious endpoint of a network connection, such as network traffic arising from or occurring between installed malware components. Further, known malicious encrypted network traffic includes encrypted network traffic relating to communications between a malicious entity, such as a malicious software application, and a genuine (non-malicious) software application, where the genuine software application is susceptible to a vulnerability and the malicious software application is communicating with the genuine software application to exploit such vulnerability. Other types, forms and categories of malicious encrypted network traffic will be known to those skilled in the art and any or all of these types of malicious encrypted network traffic are suitable as a basis for defining CFD measures associated with a portion of network traffic of a malicious network connection.

Notably, malicious network traffic can include encrypted and unencrypted portions. It will, therefore, be clear to those skilled in the art that a CFD measure associated with a portion of network traffic of a malicious network connection can include at least part of the portion being unencrypted. This is because the malicious network connection may be primarily encrypted in terms of the substantive payload of the network connection (e.g. the encrypted malware, or malware communication, communicated via the network connection).

For example, the dictionary data store 508 can include records for different malware or exploits, X and Y, providing ranges of CFD measure indicative of such malware, of such as:

| Malware or Exploit | Portion | Measure of CFD |
|---|---|---|
| X | Portion n | a to b |
| Y | Portion m | c to d |
| ... | | ... |

Notably, the 'portion' is protocol specific and accordingly implies a particular protocol. Where malware communicates over, or exploits, potentially multiple application protocols, then multiple malware entries can occur in the dictionary 508 including entries for different portions, constituting different protocols. Alternative formulations of the dictionary 508 will be apparent to those skilled in the art.

Figure 6A:
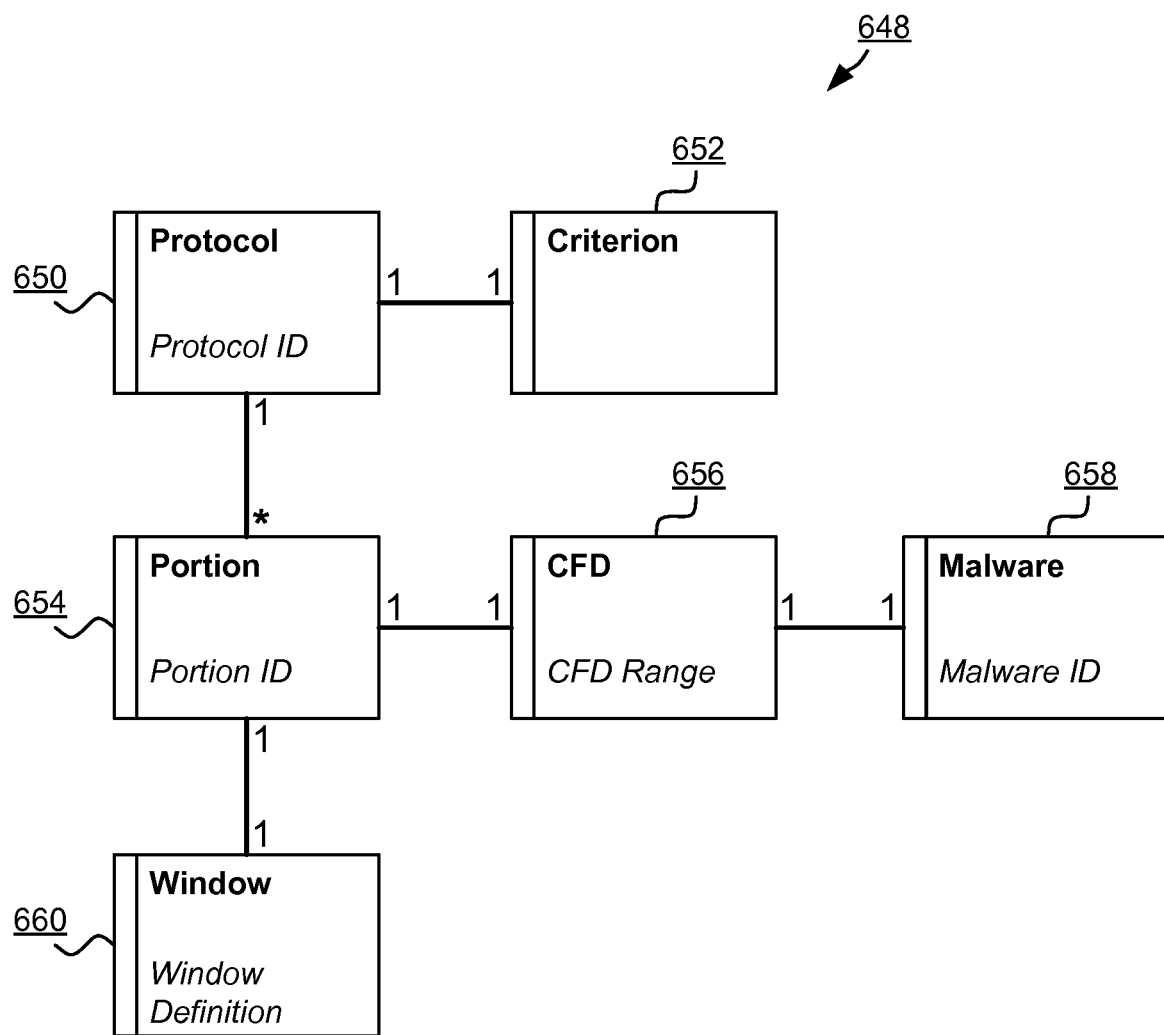
FIG. 6a illustrates an exemplary data schema in accordance with an embodiment of the present disclosure.

FIG. 6a illustrates an exemplary data schema 648 in accordance with an embodiment of the present disclosure. The data schema 648 includes data structure definitions and relationships suitable for storing data for the operation of the embodiment of FIG. 5. A protocol data structure 650 includes a unique protocol identifier and has a one-to-one association with a protocol criterion 652. For example, the criterion 652 can include a port number. In an alternative embodiment, the protocol 650 can be associated with one or more criteria that uniquely define a particular application network protocol. The protocol 650 is further associated with any number of portion definitions 654, each portion having a unique identifier. Each portion is defined by association with a window 660 having a window definition. For example, a window can be defined by a byte offset of a starting point and an ending point in a network connection data stream. Other suitable mechanisms for defining windows in a network connection data stream will be apparent to those skilled in the art. The portion 654 further has a one-to-one association with a CFD data structure 656. In the exemplary embodiment of FIG. 6a, the CFD data structure 656 includes a CFD range, such as a low CFD measure to a high CFD measure. Other suitable mechanisms for recording one or more or a range of CFD measures for a portion 654 can alternatively be employed. For example, a midpoint CFD measure can be recorded in the CFD data structure 656, and a definition of a configurable or predetermined similarity criterion (such as a maximum distance from the midpoint CFD) can be employed to determine similar measures of CFD with reference to the CFD data structure 656. The CFD data structure 656 has a one-to-one association with a malware record 658. The malware record relates to a particular piece of malware or a particular exploit having a unique identifier.

In one embodiment, the data schema 648 is implemented using relational data storage means, such as a relational database. In such an embodiment, the protocol information store 524 can have a table definition as:

| Protocol ID (primary key) | Criterion (foreign key) |
|---|---|
| ... | ... |

Further, the traffic portion definitions store 526 can have a table definition as:

| Portion ID (primary key) | Protocol ID (foreign key) | Window |
|---|---|---|
| ... | ... | ... |

A schema such as is illustrated in FIG. 6a provides a per-protocol, per-malware definition of a portion of network traffic. It will be appreciated that such an arrangement can provide for potentially multiple portions defined for each protocol as most suitable portions for identifying the presence of malicious encrypted communication attributable to multiple malwares and/or exploits.

Figure 6B:
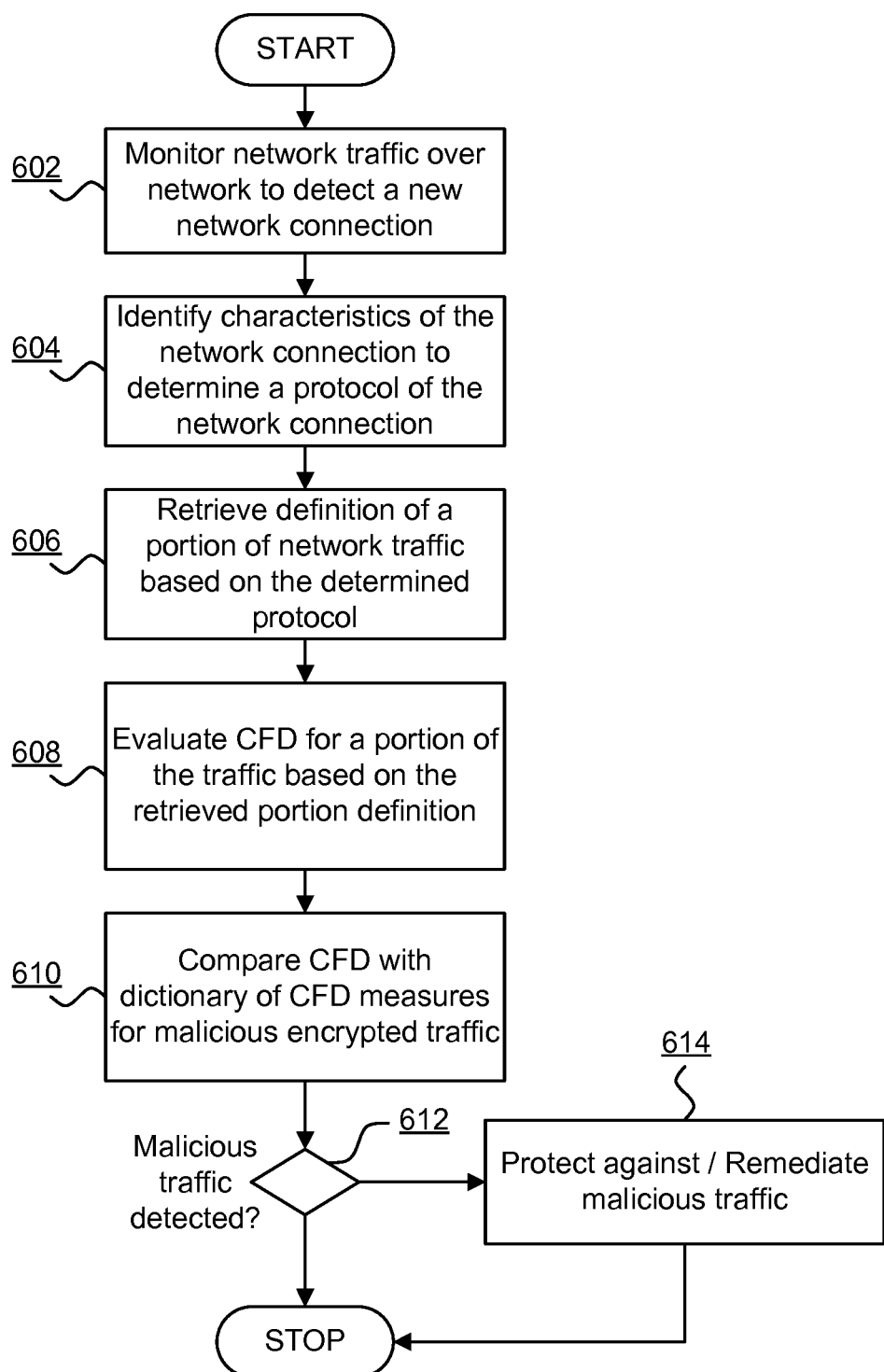
FIG. 6b is a flowchart of a method of the malicious network traffic detector of FIG. 5 in accordance with an embodiment of the present disclosure.

FIG. 6b is a flowchart of a method of the malicious encrypted traffic detector 500 of FIG. 5 in accordance with an embodiment of the present disclosure. Initially, at 602, the monitor 520 monitors network traffic over the network 502 to detect a new network connection. Such detection can be made by identifying network connection setup messages such as TCP "SYN," "SYN/ACK," "ACK" segments. At 604 the analyzer 522 identifies characteristics of the network connection to determine a protocol of the network connection. At 606 a definition of a portion of the network traffic is retrieved based on the protocol identified at 604. It will be appreciated that multiple portion definitions may alternatively be retrieved, in which case subsequent steps are repeated for each portion. At 608 a measure of CFD is evaluated for a portion of network traffic in the network connection based on the portion definition (or definitions) retrieved at 606. At 610 the evaluated measure of CFD is compared with the measures of CFD in the dictionary data store 508 to determine if malicious encrypted traffic is detected at 612. Where malicious encrypted traffic is detected at 612, the method proceeds to 614 to instigate protective and/or remedial measures to protect one or more computer systems from negative effects of the malicious network traffic and/or malicious software associated with the malicious network traffic.

In this way embodiments of the present disclosure utilize the distinctive nature of application protocol connection setup characteristics as a basis for evaluating a measure of CFD of a network connection as a distinguishing feature for the network connection. Connection setup negotiation, protocol selection, parameter selection, encryption options including cipher or algorithm selection and parameters, key exchanges and the like all constitute characterizing features of the connection setup portion of an application protocol. Notably, such features will be consistent between communications such that malicious software will largely employ similar or identical characteristics in application protocol setup. There can be constraints on malware that require consistent communication setup—such as a need for an approach to communication setup that is be compatible between a local and remote system and therefore cannot change dramatically. For example, malware at a server seeking to communicate with installed malware at a client will employ a network connection having connection setup characteristics known to be compatible with, or expected by, the installed malware at the client. Further, exploitation of certain system vulnerabilities can require certain communication configuration, including application protocol setup. Accordingly the constraints on malware to the variability of connection setup characteristics results in the connection setup process for an application protocol as a good distinguishing characteristic for malicious encrypted communication.

The types of encrypted communication that are suitable for detection by embodiments of the present disclosure include, inter alia, communication between systems infected with malware, such as malware-to-malware communication. Further, communication can include communication from a malware server to a client computer system for the purpose of exploitation and installation/transfer of malware (such as infection). These types of communication are considered below with respect to FIGS. 7, 8a and 8b.

Figure 7:
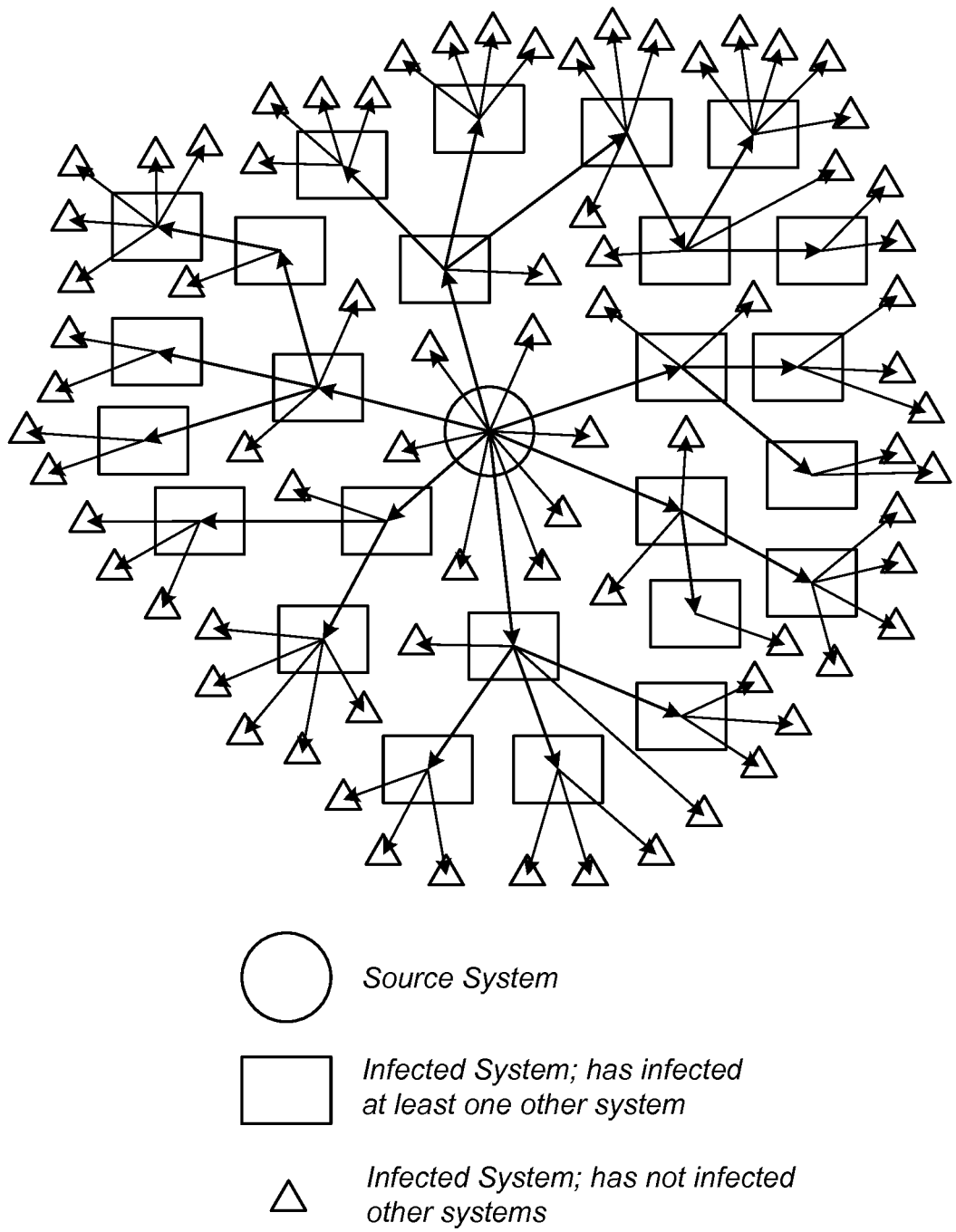
FIG. 7 is a depiction of a propagation tree of self-propagating malware.

The propagation of malware throughout computer systems via computer networks has been studied by Chen et al. in "Spatial-Temporal Modeling of Malware Propagation in Networks" (IEEE, 2005). Chen et al. identify multiple observed approaches to malware propagation including random scanning, in which a malware infection seeks to infect targets randomly, and topological scanning in which malware examines local network configuration files to detect network neighbor candidates for malware infection. FIG. 7 is a depiction of a propagation tree of self-propagating malware. A source of malware is illustrated as a network connected computer system depicted by a circle. Each network connected computer system infected by the malware that have also infected other systems is depicted by a rectangle. Each network connected computer system infected by the malware that have not infected other systems is depicted by a triangle. It can be seen, from FIG. 7, that self-propagating malware can rapidly lead to large numbers of infected systems spanning a wide network reach. Where the mode of propagation is by transfer of encrypted malware in a network communication, each propagation (each arrow in FIG. 7) can correspond to a network connection between an infecting and a target system, across which encrypted malware may be communicated. These network connections are monitored by embodiments of the present disclosure to detect malicious encrypted network traffic to prevent, protect against or remediate malware infections.

Figure 8A:
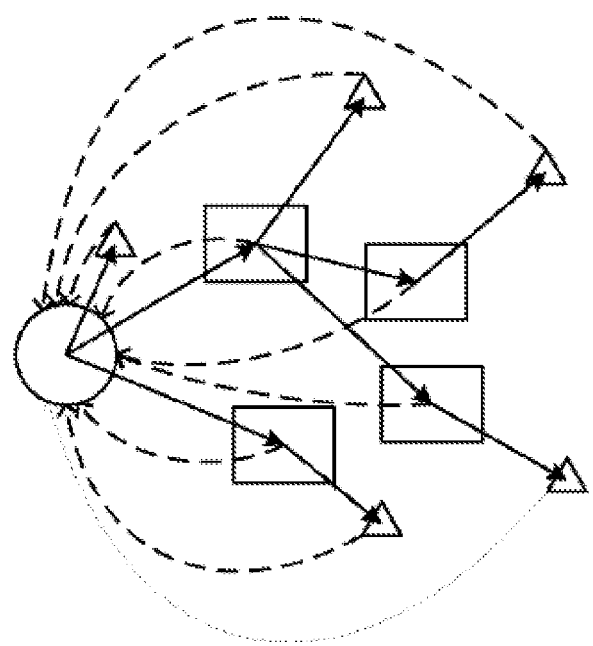
FIG. 8a is a portion of the propagation tree of self-propagating malware of FIG. 7 with additional network communications indicated.

FIG. 8a is a portion of the propagation tree of self-propagating malware of FIG. 7 with additional network communications indicated. The broken lines in FIG. 8a indicate possible network connections between infected systems and a source of malware, such as a malware mothership (indicated by the circle). Each of these network connections can be used to share information about infected systems, to communicate data extracted, stolen or otherwise accessed from infected systems, to instruct or control infected systems etc. Accordingly, each of these communications can be undertaken in encrypted form by using encrypted application protocols and these communications can be monitored by embodiments of the present disclosure to detect malicious encrypted network traffic to prevent, protect against or remediate malware infections.

Figure 8B:
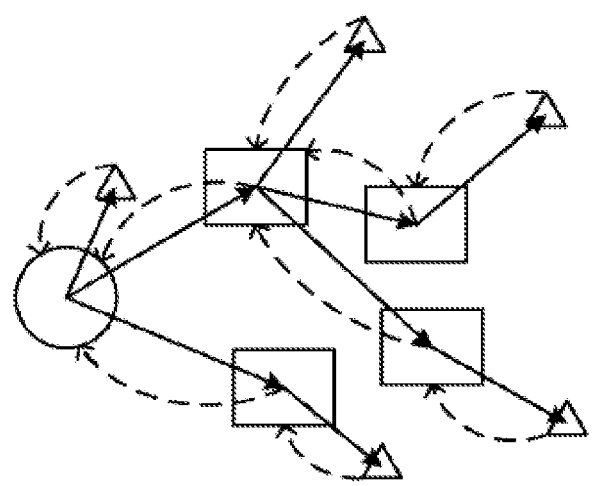
FIG. 8b is a portion of the propagation tree of self-propagating malware of FIG. 7 with additional network communications indicated.

FIG. 8b is a portion of the propagation tree of self-propagating malware of FIG. 7 with additional network communications indicated. The broken lines in FIG. 8b indicate possible network connections between infected systems. Malware may operate with infected systems communicating with each other to distribute the range of addresses between which the malware communicates to a set of unpredictable and disparate addresses as a means to avoid detection. Thus, only a small set of malware infected systems may communicate directly with a malware source. Each network connection in FIG. 8b can be used to share information about infected systems, to communicate data extracted, stolen or otherwise accessed from infected systems, to instruct or control infected systems etc. Accordingly, each of these communications can be undertaken in encrypted form by using encrypted application protocols and these communications can be monitored by embodiments of the present disclosure to detect malicious encrypted network traffic to prevent, protect against or remediate malware infections.

In one embodiment, the portion of network traffic for which an measure of CFD is evaluated is selected from a plurality of possible windows of network traffic based on a degree of consistency of similarity of measures of CFD for known malicious encrypted traffic. That is to say, in certain embodiments, a portion for CFD evaluation is continuous subset of known malicious traffic occurring within a particular window that exhibits consistently similar measures of CFD such that the portion constitutes an effective basis for characterizing the malicious traffic. Accordingly, the portion constitutes an effective basis for detecting the malicious traffic.

Figure 9:
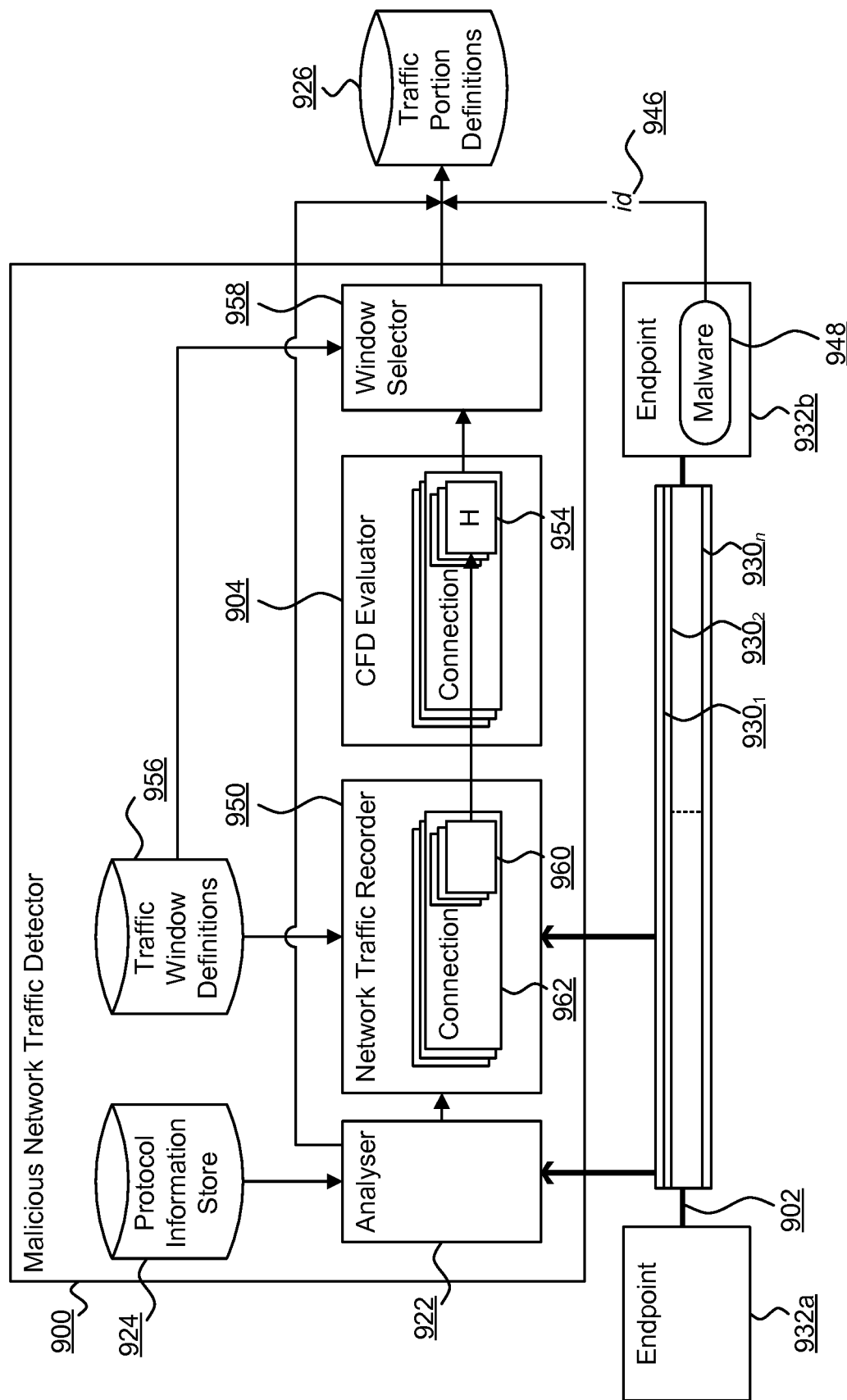
FIG. 9 is a component diagram of a malicious network traffic detector adapted to determine traffic portion definitions for malware in accordance with an embodiment of the present disclosure.

FIG. 9 is a component diagram of a malicious network traffic detector 900 adapted to determine traffic portion definitions 926 for malware 948 in accordance with an embodiment of the present disclosure. The detector 900 is a software, hardware or firmware component operable with a computer network 902 and can constitute all of, part of, or an adapted type of detector such as those described above with respect to FIGS. 2a and 5. Communication endpoints 932a and 932b are network connected devices such as computer systems, pervasive devices, network appliances and the like. Alternatively, the communication endpoints 932a and 932b can be software components such as virtualized computer systems operating within a computer system, such as virtual machines, emulated machines or applications executing within a computer system. At least communication endpoint 932b includes malware 948 as a malicious component such as a malicious software component adapted to communicate with endpoint 932a using network connections that may be encrypted. The malware 948 and network 902 operate in a fashion that is observable by the malicious network traffic detector 900. In use of the detector 900, the malware 948 is observed in operation multiple times to establish and communicate via multiple network connections $930_1$, $930_2$, $930_n$. For example, the malware 948 can be executed repeatedly, or multiple instances of the malware can be executed. The communication by malware 948 by way of the network connections $930_1$, $930_2$, $930_n$ can be for, inter alia: exchanging data with malware also installed at endpoint 932a; identifying, testing or exploiting a vulnerability at endpoint 932a; communicating encrypted malware or shellcode (such as polymorphic shellcode) to endpoint 932a; receiving information such as data from endpoint 932a; or other reasons as will be apparent to those skilled in the art.

In one embodiment, the network connections $930_1$, $930_2$, $930_n$ can be loopback network connections between software components executing on a single computing device. For example, the network 902 can be a virtual network in the sense that networking protocols are operable to constitute the network 902 though communications for the network connections $930_1$, $930_2$, $930_n$ do not leave a computing device to travel on physical network media or wirelessly external to the computing device.

The detector 900 includes an analyzer 922, CFD evaluator 904 and protocol information store 924 substantially as hereinbefore described with reference to FIG. 5. The detector 900 further includes a network traffic recorder 950 for recording network traffic 960 communicated over a network connection $930_1$, $930_2$, $930_n$, the recording being undertaken in accordance with network traffic window definitions 956 for an application protocol for a network connection determined by the analyzer 922. The network traffic window definitions 956 define windows of network traffic as candidate portions of network traffic for recording by the recorder 950. The candidate portions are used to select a portion as a traffic portion definition 926 for detection of malware according to, for example, the embodiments described hereinbefore with reference to FIG. 5. Each network traffic window definition 956 is specific to a network protocol. In one embodiment, one or more network traffic window definitions 956 can also be specific to, or defined in view of, a particular malware 948, such as in view of known, observed or understood characteristics of a particular malware including application protocol connection setup characteristics and/or vulnerability exploitation characteristics.

Figure 10:
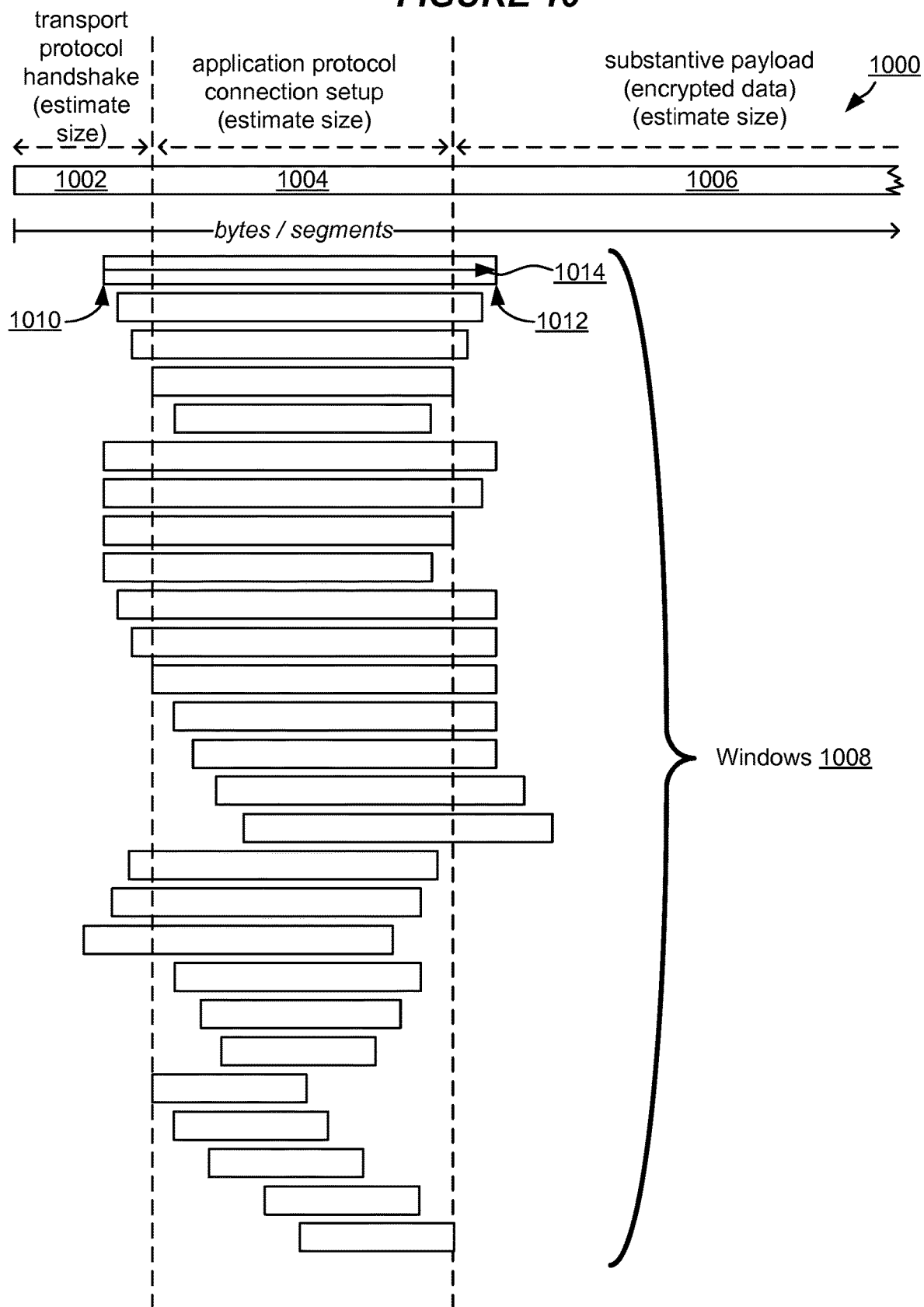
FIG. 10 depicts an exemplary set of traffic window definitions for an application protocol for an exemplary network connection in accordance with an embodiment of the present disclosure.

FIG. 10 depicts an exemplary set 1008 of traffic window definitions for an application protocol for an exemplary network connection 1000 in accordance with an embodiment of the present disclosure. Data communicated via the network connection 1000 of FIG. 10 is generally divided into three parts, each having an estimated size indicated in FIG. 10 (purely illustratively) and including: a transport protocol handshake part, estimated to constitute generally the portion 1002; an application protocol connection setup part, estimated to constitute generally the portion 1004; and a substantive encrypted data payload part, estimated to constitute generally the portion 1006. The exact size, length or extent of each part of the exemplary network connection of FIG. 10 may not be known for a number of reasons. The exact nature of the transport handshake 1002 may not be known since the handshake may range from a minimal number of message or segment exchanges between communicating endpoints and a most protracted number. Similarly, the exact nature and extent of the application protocol connection setup 1004 may also be unknown since part of the connection setup may be encrypted and the exact nature of the application protocol may not be known, and/or the extent of connection setup could range from minimal to protracted. Further, the application protocol setup may constitute part or all of the exploitation process of the malware 948 in exploiting a vulnerability at a target system 932a, and accordingly the nature of such connection setup may be atypical. Consequently, the starting point, ending point and extent of the application protocol connection setup 1004 may not be precisely known. Accordingly, a plurality of window definitions 1008 are predetermined such that each window defines a different subset of network traffic for a network connection with the intention that all windows seek to cover at least part of the application protocol connection setup part 1004 of network traffic for a network connection. Each window can be defined by way of a start point 1010 and an end point 1012, each of the start and end points indicating a location in network traffic for a network connection such as a byte, message, segment or packet offset in network traffic. Alternatively, a start point 1010 and an extent, length or size 1014 can define a window. As depicted in FIG. 10, the windows 1008 are generally defined to span different continuous subsets of network traffic, covering at least a portion of the estimated location of an application protocol connection setup 1004, in order to provide a useful basis for identifying a most promising window as a portion of network traffic for a protocol and/or malware for identifying encrypted network traffic by the malicious encrypted traffic detector 900.

In one embodiment, a primary window is defined, from which the plurality of windows 1008 are derived. Such a primary window is defined to have a size and position based on a predetermined estimate of a size of an application protocol connection setup, and wherein each of the windows in the plurality of windows 1008 has a size in a range of sizes from a first predetermined delta size below the primary windows size to a second predetermined delta size above the primary window size.

Returning to FIG. 9, the network traffic recorder 950 records a subset of network traffic 960 received over a network connection for each applicable window defined in the traffic window definitions 956. Applicable windows are windows associated with a protocol for the network connection. Thus, in use, the recorder 950 records a plurality of subsets of network traffic 960 for each of the malware network connections $930_1$, $930_2$, $930_n$. Each subset of network traffic 960 recorded for a network connection is associated with a particular traffic window definition. In one embodiment, the network traffic recorder 950 accesses network traffic for a network connection $930_1$, $930_2$, $930_n$ only once and copies subsets of the accessed network traffic in accordance with the applicable traffic window definitions 956 to generate the plurality of subsets of network traffic 960. For example, the network traffic recorder 950 can record network traffic from an earliest point in all applicable window definitions to a latest point in all applicable window definitions such that, subsequently, the particular window definitions can be used to extract subsets of the recorded traffic to store network traffic subsets 960 for each window definition.

The CFD evaluator 904 of FIG. 9 is adapted to evaluate, for each of the subsets of network traffic 960 recorded for each of the connections $930_1$, $930_2$, $930_n$, a measure of CFD ("H") 954. FIG. 10 is an exemplary illustration of measures of CFD evaluated for a plurality of traffic window definitions 956 for a plurality of network connections $930_1$, $930_2$, $930_n$. FIG. 10 illustrates CFD measures for three exemplary network connections A, B and C of malware communicating encrypted network traffic. Each connection has a distribution of evaluated CFD measures (H) for a set of windows, each window being identified by window identifiers ("window id" in a range 1 to 8 in the present example.) The windows for each connection are the same such that the CFD measures for discrete windows of network traffic between connections can be compared.

Returning to FIG. 9, the detector further includes a window selector 958 as a software, hardware or firmware component for identifying a window as a network traffic portion definition for storage in a traffic portion definitions store 926. The traffic portion definitions store 926 is substantially as hereinbefore described with respect to FIG. 5. A window is identified from a set of applicable windows for the malware 948, i.e. windows associated with a protocol for the network connections $930_1$, $930_2$, $930_n$ and for which measures of CFD H are evaluated by the CFD evaluators 904. A window is identified by the window selector 958 as a window for which a measure of CFD across a plurality of network connections $930_1$, $930_2$, $930_n$ is most similar or consistent. In one embodiment, the window selector 958 evaluates a measure of similarity of CFD measures for each window across a plurality of network connections $930_1$, $930_2$, $930_n$ to identify a window with most consistently similar measures of CFD. Thus, in such an embodiment, windows can be ranked by the measure of similarity to identify a most consistently similar window. Techniques for measuring similarity between CFD measures will be apparent to those skilled in the art and can include, for example, similarity functions or inverse distance metrics, such as similarity measures based on Euclidean distance. Clustering algorithms could also be employed to gauge the similarity of a plurality of CFD measures. Models or graphs plotting the enumerator and the denominator of the CFD evaluation formula can be used to provide slopes, lines, or representations thereof, the linear gradient of which constitutes a CFD measure. In such embodiments a comparison between CFD measures can be achieved by a comparison of such models or plots such as by evaluating and comparing gradients or by comparing plots, slopes or lines using a suitable comparison technique to identify similarity or a degree of similarity. Notably, where more than two network connections are used to evaluate window CFD measures, consistency or deviation of the degree of similarity between CFD measures for a window becomes pertinent. That is to say that the relative similarity of all measures of CFD for a window can be measured, and a window having measures of CFD that are most similar or consistent overall can be identified by the window selector 958. In this regard, embodiments of the disclosure can employ clustering algorithms such as, inter alia, k-means algorithms, distribution-based clustering algorithms and/or density-based clustering algorithms to identify clusters of CFD measures among all CFD measures for a window. Such clustering algorithms can be adapted to identify windows having most tightly clustered CFD measures as windows having most consistently similar CFD measures. For example, CFD measures for a window that can all be clustered into a single cluster constitute similar CFD measures. Windows having such similar CFD measures can be me measured for a degree or consistency of similarity between the CFD measures. One technique for achieving this involves measuring the variability or deviation of the CFD measures in the cluster. For example, a maximum, average or most frequent deviation from a central, average, mean or median CFD measure can be used as a measure of the degree or consistency of similarity of all CFD measures in a cluster for a window. Other suitable techniques for measuring and comparing relative degrees of similarity and consistency of CFD measures for a window will be apparent to those skilled in the art.

Figure 11:
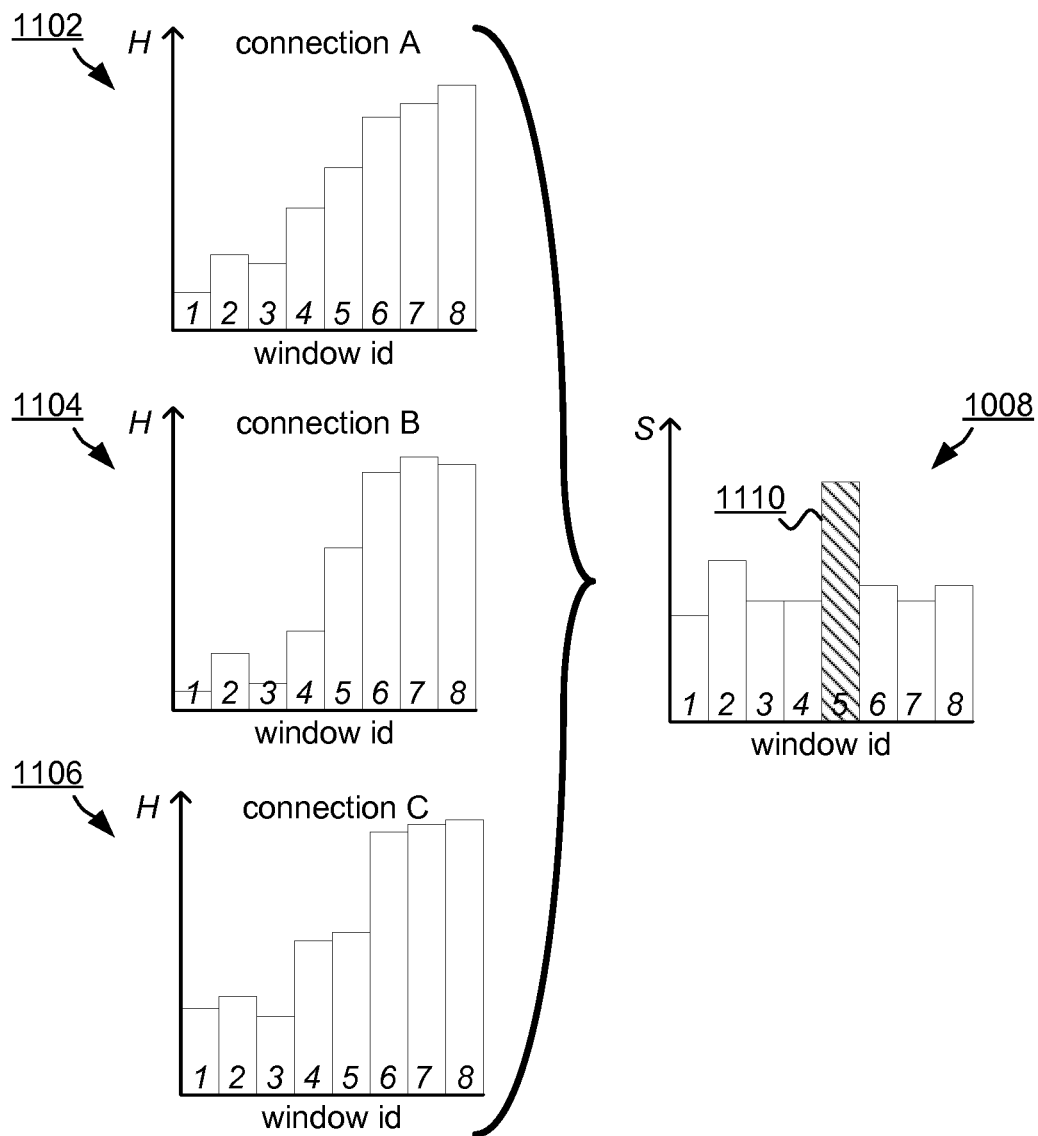
FIG. 11 is a graphical depiction of similarity measures for a plurality of windows across a plurality of connections in accordance with an embodiment of the disclosure.

Thus, the window selector 958 identifies a window determined to have a greatest degree of consistent similarity of CFD measures across multiple malware network connections $930_1$, $930_2$, $930_n$. Turning to FIG. 11, a graphical depiction of similarity measures, S 1008, for each window across all network connections is shown. It can be seen that a most consistently similar window 1110 is identified by the window selector 958 and used to generate a new traffic portion definition 926. In practice, such an identified window may be consistently similar for both malicious encrypted network traffic and also for genuine or non-malicious network traffic. For example, a window may be identified by the window selector 958 that is always identical for all network connections (whether malicious or not) for a particular application protocol. Such a window is not suitable for use in the detection of malicious encrypted network traffic since such a window would always exhibit consistent characteristics and the measure of CFD may stay substantially the same irrespective of the nature of a network connection. Accordingly, it is advantageous that the window selector 958 further undertakes a process of elimination of windows identified by the window selector 958 to exclude from the identification windows having CFD measures for known malicious encrypted traffic that are similar, by some predetermined degree of similarity or clustering, to CFD measures for known non-malicious traffic. The process of elimination is based on non-malicious traffic relating to communications using the same application protocol as that for the known malicious network traffic. Thus, the identification of a portion as a window can be based on a determination that evaluations of CFD measures of the window are inconsistent between malicious encrypted network traffic and non-malicious network traffic such that a window for which CFD measures are substantially similar for malicious and non-malicious traffic are eliminated from selection as a portion for malicious encrypted network traffic detection.

On identification of a portion by the window selector 958, a traffic portion definition 926 is generated for use by the methods and apparatus hereinbefore described to detect malicious encrypted network traffic on a network. Additionally, the process of identifying a window for a traffic portion definition 926 by the window selector 958 further includes the identification of typical CFD values for encrypted network traffic occurring in the window. Accordingly, the portion identification by the window selector 958 is suitable also for defining records in the dictionary data store 508 as reference measures or reference ranges of CFD as described with respect to FIG. 5. In particular, reference CFD measures in the dictionary data store 508 can be defined for an application protocol and malware 948 based on the CFD measures, or range of CFD measures, for the identified window. Thus, advantageously, the window selector 958 further stores, in a dictionary 508, a reference measure of CFD in association with an identifier of the malicious software component 948, the reference measure being derived from the evaluated measures of CFD for the identified window for each of the network connections $930_1$, $930_2$, $930_n$.

The relative degree of similarity of all CFD measures for a window is further informative of the degree of similarity, or margin of error, that is permitted when employing a traffic portion definition 926 in the identification of malicious traffic. That is to say the extent to which CFD measures for a window across a plurality of network connections $930_1$, $930_2$, $930_n$ are consistently similar when defining traffic portion definitions 926 informs a determination of an extent to which a CFD measure for a connection setup portion of a network connection must be similar to the traffic portion CFD measure to conclude that the connection is malicious. Thus, where the window selector 958 evaluates CFD measures for a window of network traffic for known malware 948 as having a high degree of similarity, the subsequent use of the window as a traffic portion definition 926 to detect malicious traffic in a production environment will require a correspondingly high degree of similarity with the reference measure of CFD in the dictionary.

Figure 12:
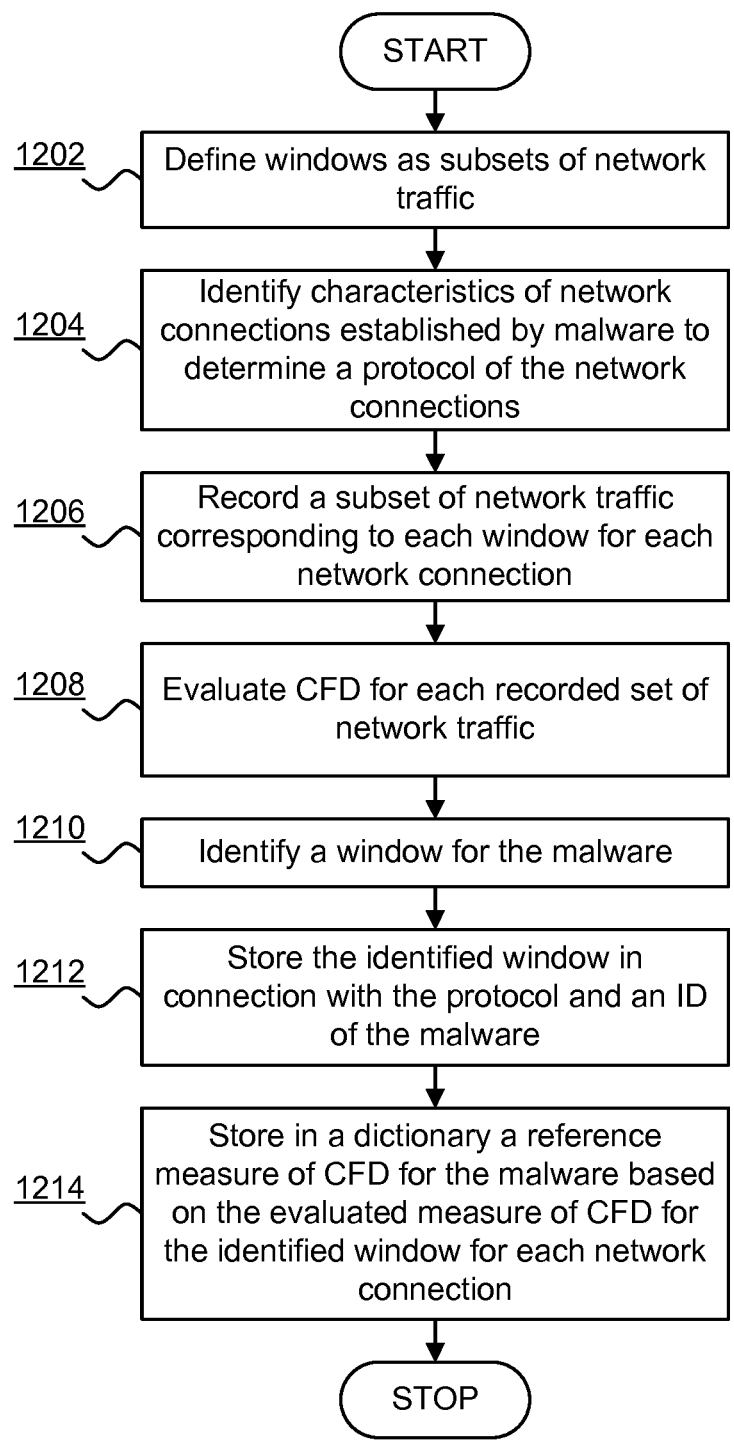
FIG. 12 is a flowchart of a method of the detector of FIG. 9 for defining traffic portion definitions for malware in accordance with an embodiment of the present disclosure.

FIG. 12 is a flowchart of a method of the detector of FIG. 9 for defining traffic portion definitions 926 for malware 948 in accordance with an embodiment of the present disclosure. Initially, at 1202, traffic window definitions 956 are defined as subsets of network traffic. At 1204 the analyzer 922 identifies characteristics of the network connections $930_1$, $930_2$, $930_n$ established by the malware 948 with reference to a protocol information store 924 to determine a protocol of the network connections $930_1$, $930_2$, $930_n$. At 1206 the recorder 950 records a subset 960 of network traffic corresponding to each window applicable to the determined protocol for each network connection $930_1$, $930_2$, $930_n$. At 1208 the CFD evaluator 904 evaluates a measure of CFD 954 for each recorded set of network traffic. At 1210 the window selector 958 identifies a portion of malicious network traffic as a window corresponding substantially to a connection setup portion of a malicious network connection using an application protocol for characterizing the malicious network connection. The portion is stored in the traffic portion definitions 926. At 1214, a reference measure (or range of measures) of CFD for the portion of malicious network traffic for the malware 948 is added to the dictionary 508 based on the evaluated measures of CFD for the identified window across the plurality of network connections $930_1$, $930_2$, $930_n$.

Figure 13:
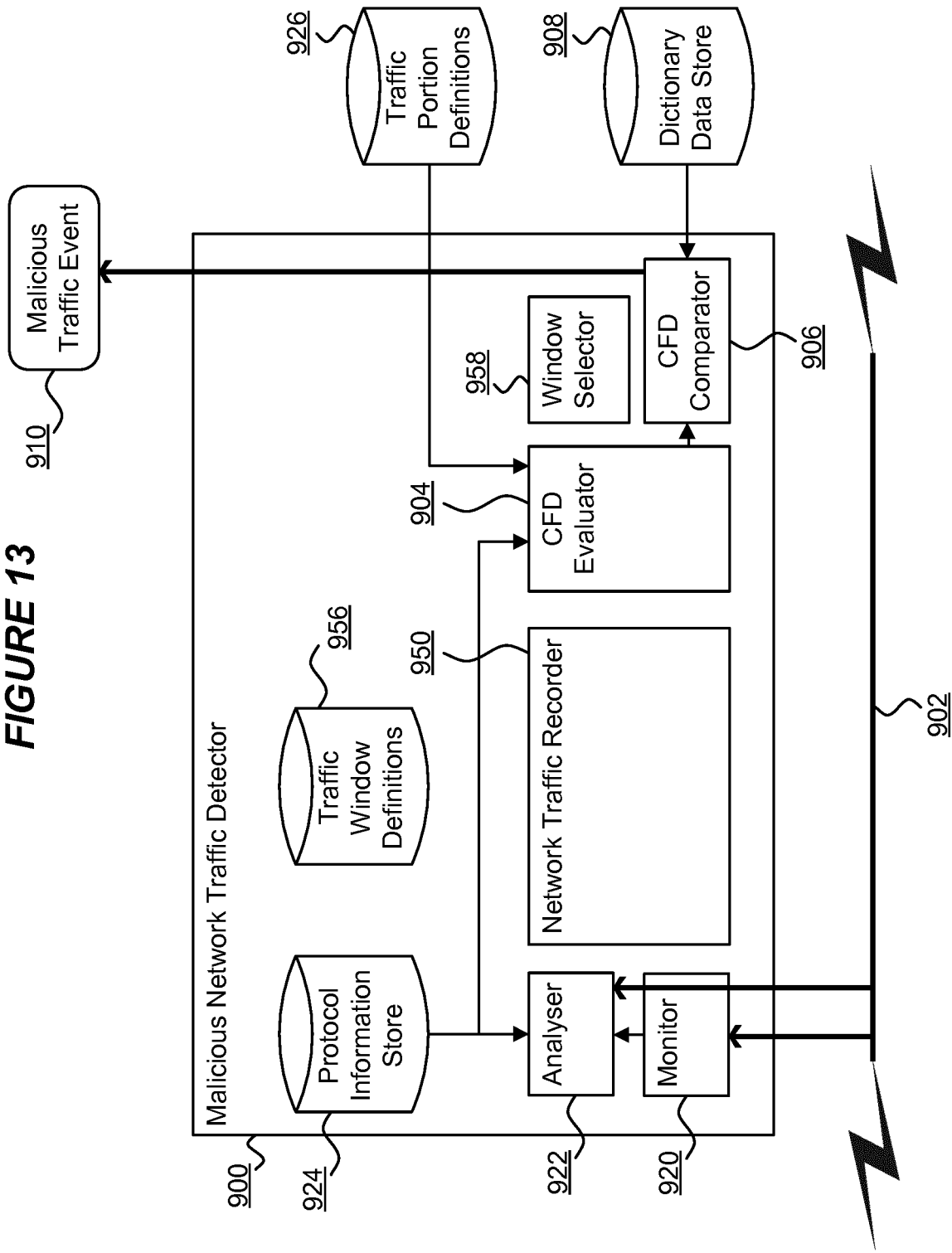
FIG. 13 is a component diagram of the malicious network traffic detector of FIG. 9 configured to identify malicious network traffic communicated via a computer network in accordance with an embodiment of the present disclosure.

FIG. 13 is a component diagram of the malicious network traffic detector 900 of FIG. 9 configured to identify malicious network traffic communicated via a computer network 902 in accordance with an embodiment of the present disclosure. In particular, the detector 900 of FIG. 13 further includes a monitor 920 and dictionary data store 908 substantially as hereinbefore described with respect to FIG. 5. Thus, completion of the method of FIG. 12 for potentially multiple known malware components or exploits, traffic portion definitions 926 and a dictionary 908 are generated in order that monitored network traffic communicated via the network 902 can be assessed for malicious encrypted network traffic by comparison of measures of CFD with reference measures stored in the dictionary 908. On identification of malicious encrypted network traffic by the comparator 906, a malicious traffic event 910 is generated for triggering or instigating remedial, preventative, communicative or protective measures, examples of which are further described below.

Figure 14:
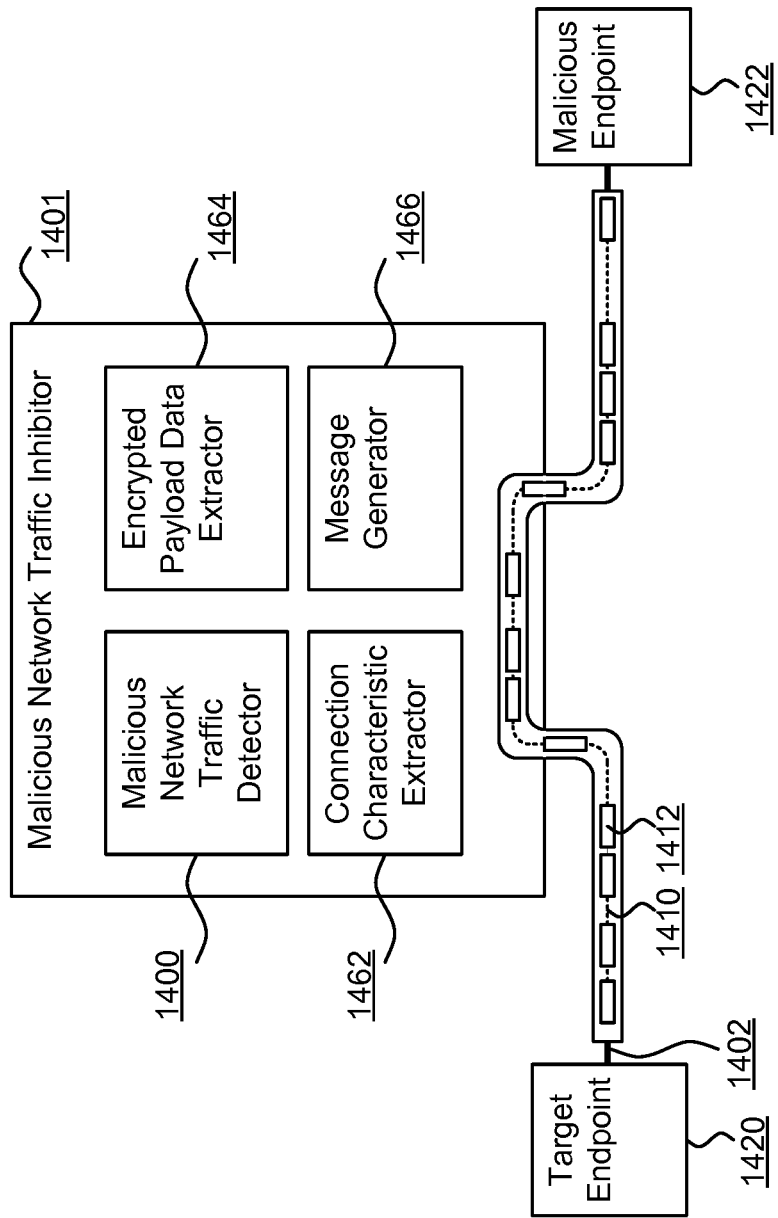
FIG. 14 is a component diagram of a malicious network traffic inhibitor configured to identify and inhibit malicious encrypted network traffic communicated via a computer network in accordance with an embodiment of the present disclosure.

FIG. 14 is a component diagram of a malicious network traffic inhibitor 1401 configured to identify and inhibit malicious network traffic communicated via a computer network 1402 in accordance with an embodiment of the present disclosure. A network connection 1410 is initiated via the computer network 1402 for communication of malicious network traffic including network messages 1412 such as packets, segments or the like between a malicious endpoint 1422 and a target endpoint 1420. The malicious endpoint 1422 is a computer system executing malicious software such as malware for the exploitation of vulnerabilities in other computer systems such as the target endpoint 1420. The malicious endpoint 1422 may itself have a target of malicious activity such as vulnerability exploitation, leading to its status as a malicious endpoint 1422. A malicious network traffic inhibitor 1401 is a network connected software, hardware or firmware component operable to intercept, sniff or otherwise access messages 1412 communicated via the computer network 1402. The malicious encrypted traffic inhibitor 1401 includes a malicious network traffic detector 1400 such as has been hereinbefore described in numerous embodiments including, inter alia, with respect to FIGS. 2a, 5 and 9. Additionally, the malicious network traffic inhibitor 1401 includes a connection characteristic extractor 1462, an encrypted payload data extractor 1464 and a message generator 1466 as software, hardware or firmware components provided as part of, in association with or accessible to the malicious network traffic inhibitor 1401.

The connection characteristic extractor 1462 is operable in response to the malicious network traffic detector 1400 to extract connection characteristics from network traffic for the network connection 1410. In particular, the connection characteristics include information suitable for communicating with the malicious endpoint 1422 of the network connection 1410. In one embodiment, the network connection includes an application network protocol operating via a transport protocol such as the transmission control protocol (TCP). TCP communications are conducted as a series of segments having a header portion and a payload (body) portion. Connection characteristics are maintained in the header portion of TCP segments and include address information for source and destination endpoints for a segment. Furthermore, TCP operates as a sequenced protocol such that each byte in each segment for a network connection is numbered in sequence. In this way TCP messages received at a receiving endpoint can be aggregated in a correct order and absent, missing or delayed messages can be identified for resend. This is achieved by including a sequence number field (SEQ) in the header of each TCP segment identifying the sequence number in the network connection of a first byte in the segment. Further, each TCP segment includes an acknowledgment (ACK) field indicating the sequence number of the next byte expected from a remote endpoint. In this way, the SEQ and ACK fields, in conjunction with the process of synchronization at TCP handshake described hereinbefore, serve to provide proper sequencing of bytes and messages communicated via a TCP network connection. Accordingly, such fields along with network address information constitute connection characteristics for the network connection 1410. These connection characteristics are suitable for communicating with the malicious endpoint 1422 since they provide address information for the endpoint along with up-to-date sequence information. Thus, the malicious network traffic inhibitor 1401, by way of the connection characteristics extracted from messages accessed thereby, has information required to partake in the network connection 1410 that is otherwise established between the malicious endpoint 1422 and the target endpoint 1420. The undertaking of such communication by an entity that is not an endpoint or party to a network connection is known as TCP/IP hijacking as will be familiar to those skilled in the art. TCP/IP hijacking is a form of attack or exploitation normally undertaken with malicious intent. In contrast, embodiments of the present disclosure employ a similar technique as a mechanism for inhibiting the distribution, operation or network communication of malicious software engaged in communicating encrypted network traffic.

The encrypted payload data extractor 1464 is operable in response to the malicious network traffic detector 1400 to extract at least a sample or subset of encrypted payload data from network traffic for the network connection 1410. For example, such encrypted payload can be carried in a payload or data section of one or more messages 1412, such as one or more TCP segments. The encrypted payload may be discerned based on an estimated measure of Shannon entropy of the payload data on the basis that an estimate measure of entropy for encrypted data will tend towards entropy of a random sample (tending towards maximum indeterminacy)—see for example WO2015/128613A1 for an evaluation of Shannon entropy of network traffic. In some embodiments, a sizeable or complete sample of encrypted malicious payload is extracted, being of a size suitable for transmission as part of one or more network message such as a TCP segment. In some embodiments, complete encrypted data payload information is extracted in binary form. It is not necessary to decrypt the encrypted network traffic payload since its purpose is to constitute all or part of a payload for a new message generated by the message generator 1466 and communicated to the malicious endpoint 1422. The encrypted payload, when communicated to the malicious endpoint 1422, will be recognizable to the malicious endpoint 1422 at least insofar as it is encrypted using an encryption scheme, mechanism, key or process recognizable to the malicious endpoint 1422 since it originated as part of the existing communication between the malicious endpoint 1422 and the target endpoint 1420. Thus it will appear plausible, to the malicious endpoint 1422, that messages including the encrypted data are expected network traffic as part of the network connection between the malicious endpoint 1422 and the target endpoint 1420. In one embodiment, the encrypted payload data extractor 1464 extracts encrypted payload originating from the target endpoint 1420. This is particularly beneficial if it is likely or known that an asymmetric encryption scheme is used in the communication between the malicious endpoint 1422 and the target endpoint 1420. Where a symmetric encryption scheme is employed for the malicious encrypted network traffic, encrypted payload from either the malicious endpoint 1422 or target endpoint 1420 is suitable.

Figure 15:
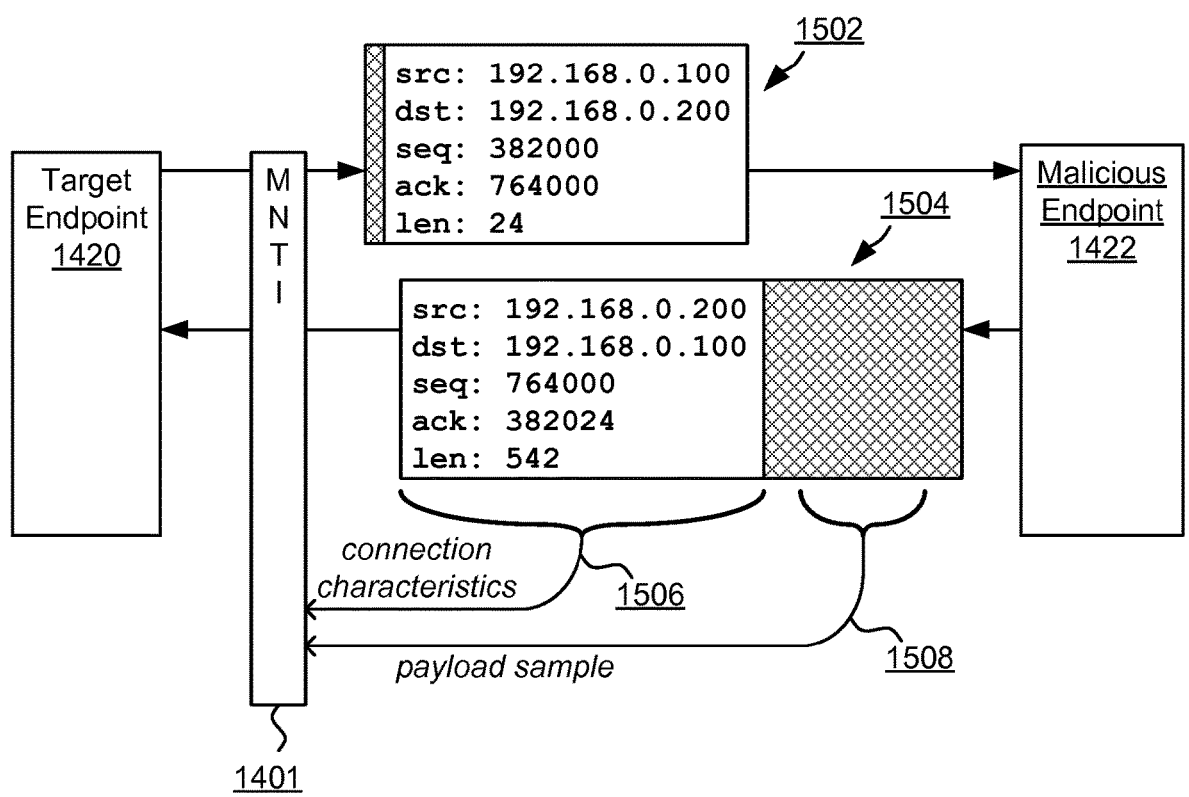
FIG. 15 is a schematic diagram of a TCP network connection between a malicious endpoint and a target endpoint in accordance with an embodiment of the present disclosure.

FIG. 15 is a schematic diagram of a TCP network connection between a malicious endpoint 1422 and a target endpoint 1420 in accordance with an embodiment of the present disclosure. The malicious network traffic inhibitor 1401 (MNTI) is operable to access TCP segments communicated via the TCP network connection. An initial message 1502 transmitted by the target endpoint 1420 includes a TCP header having: source (SRC) and destination (DST) addresses; a sequence number field (SEQ); an acknowledgement field (ACK); and a length (LEN). A second message 1504 transmitted by the malicious endpoint 1422 includes a similar header and a more substantial payload (hatched) including encrypted malicious data, such as malware software, an encrypted shellcode and exploitation code, or other malicious encrypted data. A connection characteristic extractor of the malicious encrypted traffic inhibitor 1401 is adapted to retrieve connection characteristics 1506 from a header of the message 1504 received from the malicious endpoint 1422. Further, the encrypted payload data extractor is adapted to retrieve a sample of the encrypted payload 1508 from the payload of the message 1504 received from the malicious endpoint 1422. In this way the malicious encrypted traffic inhibitor 1401 has information required to generate messages for transmission to the malicious endpoint 1422 that would appear to plausibly relate to the network connection between the malicious endpoint 1422 and the target endpoint 1420. That is to say that such messages can include at least relevant and appropriate address, sequence (SEQ) and acknowledgement (ACK) information and can further include payload data being encrypted using an encryption scheme recognizable as relating to the network connection.

Returning to FIG. 14, the message generator 1466 is operable in response to the malicious network traffic detector 1400 to generate a plurality of network messages for transmission to the malicious endpoint 1422. The generated network messages include characteristics based on or derived from the connection characteristics extracted by the connection characteristic extractor 1462, and further including payload data as encrypted malicious network traffic payload data based on or derived from data extracted by the encrypted payload data extractor 1464. Accordingly, the messages generated by the message generator 1466 will appear, to the malicious endpoint 1422, to plausibly relate to the network connection for communicating malicious encrypted network traffic. In one embodiment, the message generator 1466 generates sufficient messages that, when the messages are transmitted to the malicious endpoint 1422, the malicious endpoint 1422 becomes substantially consumed by the need to process the messages in view of the messages being plausibly related to the network connection and each requiring receipt, decryption and potentially a response. In this regard, a balance can be struck by a number (quantity) of messages for transmission to the malicious endpoint 1422 and a size (length) of each message, determined by the size of the encrypted payload.

Figure 16:
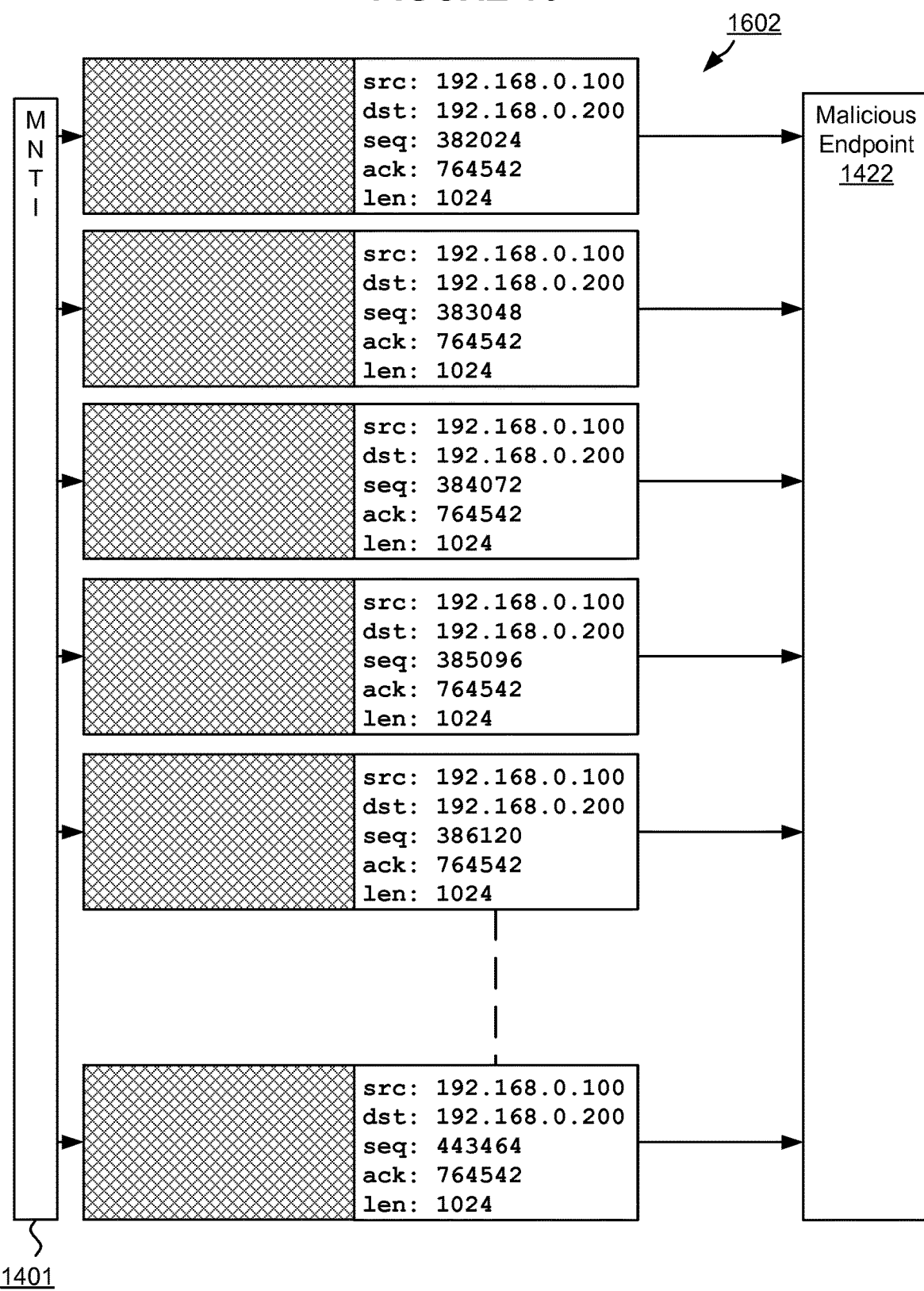
FIG. 16 is a schematic diagram of a TCP network connection between a malicious endpoint and the malicious network traffic inhibitor in accordance with an embodiment of the present disclosure.

FIG. 16 is a schematic diagram of a TCP network connection between a malicious endpoint 1422 and the malicious network traffic inhibitor 1401 in accordance with an embodiment of the present disclosure. The messages illustrated in FIG. 16 occur subsequent to the messages and occurrences of FIG. 15. In FIG. 16, the message generator 1466 of the malicious network traffic inhibitor 1401 generates a plurality of messages 1602 each including appropriate SRC and DST address information for the network connection between the malicious endpoint 1422 and the target endpoint 1420. Further, each message includes accurate and up-to-date SEQ and ACK fields. Each message includes a payload part having encrypted payload data being based on, or copied from, data extracted by the encrypted payload data extractor 1464. Thus, in use, the malicious endpoint 1422 receives a considerable number of TCP segments being plausibly related to the network connection established with the target endpoint 1420. Each segment includes appropriate address and sequencing information and each payload is encrypted with a recognizable encryption algorithm and using a known key. Accordingly the malicious endpoint 1422 sets about receiving, logging, interpreting and decrypting these many messages in a process that occupies the malicious endpoint 1422 so as to distract the malicious endpoint 1422 by consumption of resources of the malicious endpoint 1422. In parallel to such consumption of the malicious endpoint's 1422 resources, the malicious network traffic inhibitor 1401 can communicate with or notify the target endpoint 1420 of the malicious encrypted network traffic and/or cease, prevent or trigger a process of protecting against further traffic. Thus, by virtue of both these activities the malicious network traffic inhibitor 1401 serves to inhibit the ability of the malicious endpoint 1422 to generate and communicate malicious network traffic via the network connection, at least until the messages generated by the message generator 1466 cease to be transmitted.

The use of encrypted network traffic based on malicious encrypted messages accessed on a computer network is particularly beneficial and an improvement over known denial-of-service type methods for affecting remote network connected systems. Existing denial-of service methods such as SYN flooding, "the ping of death," "teardrop," "ping flooding," amplification attacks and distributed versions of any of these (distributed denial-of-service attacks) are well established and methods for protecting against such attacks are increasingly prevalent (for example, Linux operating systems employ 'syncookies' to prevent SYN flood attacks). However, methods of the present disclosure employ messages based on real network traffic to increase the plausibility of communications received by the malicious endpoint 1422 so much so that the messages cannot be readily questioned until the scale of resource consumption is so great that the resource consumption itself becomes an indicator that a denial-of-service type effect is being realized at the malicious endpoint 1422. Notably, malicious systems such as malicious endpoint 1422 are typically developed to aggressively communicate with as many other systems as possible to maximize the propagation and effect of distributed and executing malware. Accordingly the propensity for such malicious systems to fall foul of high volume messages of the sort described hereinabove, with the consequence that the malicious systems cease to be effective in their distribution of, or communication with, malware, renders the approach of embodiments of the present disclosure particularly advantageous.

Figure 17:
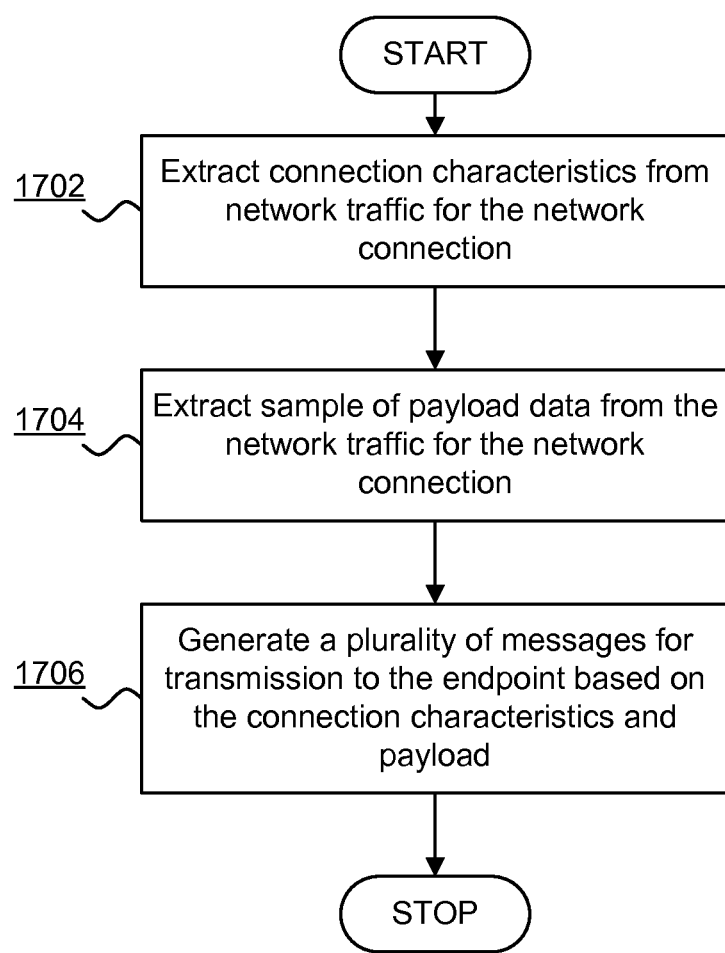
FIG. 17 is a flowchart of a method of the malicious network traffic inhibitor in accordance with an embodiment of the present invention.

FIG. 17 is a flowchart of a method of the malicious network traffic inhibitor 1401 in accordance with an embodiment of the present disclosure. The method of FIG. 17 is applicable also by way of extension to the embodiments described hereinbefore with respect to FIGS. 6b and 12 and the arrangements of FIGS. 2a, 5, 9 and 14. Initially, at 1702, the connection characteristic extractor 1462 extracts connection characteristics from malicious network traffic, such as messages, packets, segments or the like, communicated via a computer network. At 1704 the encrypted payload data extractor 1464 extracts at least a sample of encrypted payload from malicious encrypted network traffic, such as messages, packets, segments or the like, communicated via a computer network. Finally, at 1706, the message generator 1466 generates a plurality of messages for transmission to a malicious endpoint 1422, each of the messages being characterized by the extracted connection characteristics and including a payload derived from the extracted sample of encrypted payload data so as to overwhelm the malicious endpoint 1422 with messages plausibly relating to the malicious network connection in order that the malicious endpoint 1422 substantially ceases to engage in malicious network communication with the target endpoint 1420.

Thus methods and techniques in accordance with embodiments of the present disclosure are operable to model malicious network traffic based on an evaluated measure of CFD and to identify potential network traffic based on a comparison of a measure of CFD with a reference measure for known malicious traffic. Once potential or actual malicious network traffic is identified it is advantageous to apply the techniques described above for characterizing malicious traffic based on CFD to the software engaged in the malicious network communication, such as by evaluating a measure of CFD for some portion or all of the software application to characterize the software application for subsequent detection of potentially malicious software entering, being received at, installed on or otherwise stored in a computer system. A software application can be embodied as an executable, loadable or linkable set of software instructions such as machine code, an intermediate representation of code (e.g. bytecode) or interpretable code, such as an executable file, a dynamic link library, a static library, a service routine or the like. Additionally or alternatively an application, library, service, task or process can be executing, loaded or prepared for execution in a memory of a computer system.

Figure 18:
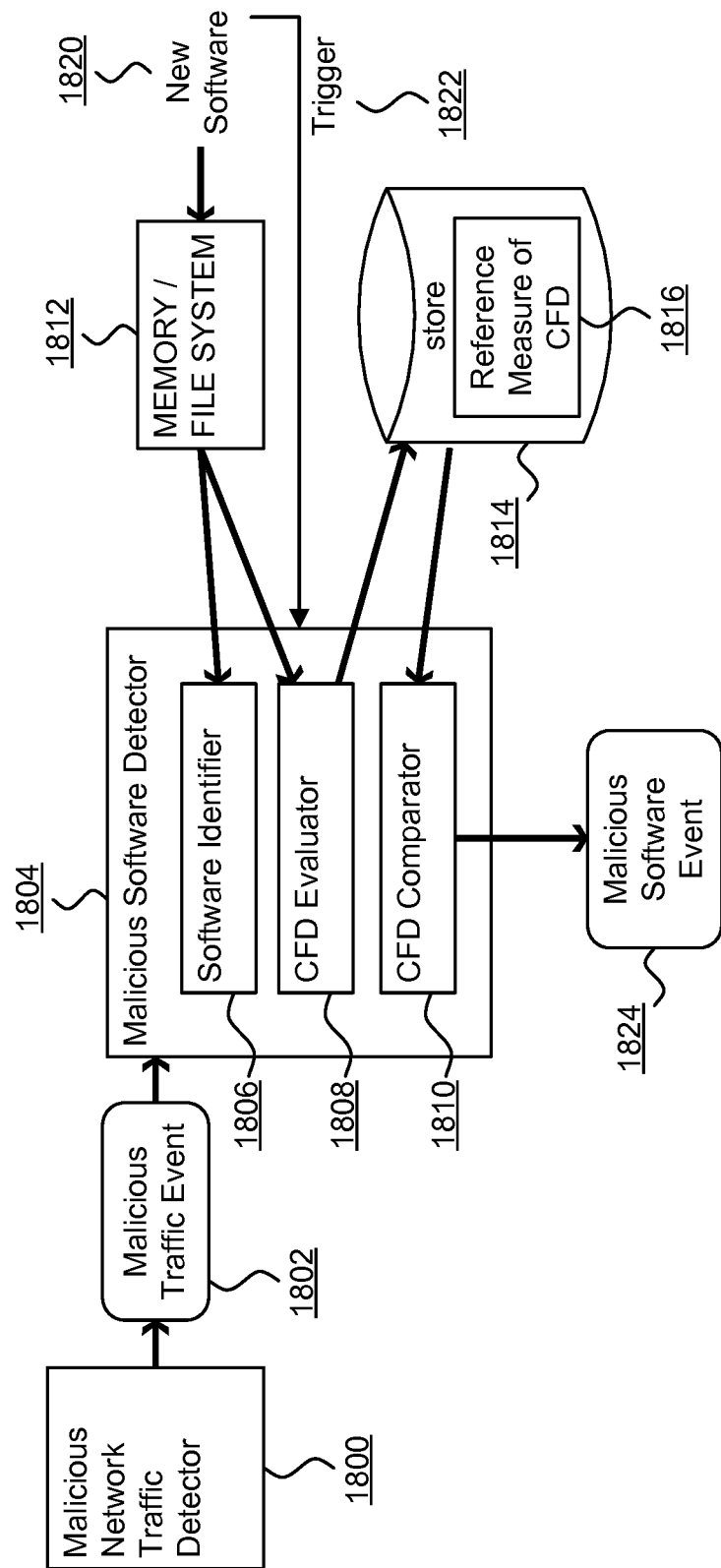
FIG. 18 illustrates a component diagram of a malicious software detector in accordance with an embodiment of the present disclosure.

FIG. 18 illustrates a component diagram of a malicious software detector 1804 in accordance with an embodiment of the present disclosure. The malicious software detector 1804 is a software, hardware, firmware or combination component responsive to receipt of a malicious traffic event 1802 such as may be generated by a malicious network traffic detector 1800 substantially as hereinbefore described. The malicious software detector 1804 includes a software identifier 1806 for identifying a software component such as a software application, applet, process, service, library, or the like associated with malicious network traffic for which the malicious traffic event 1802 is received. The software identifier 1806 can be a software component executing with an operating system of a computer system and accessing one or both of a memory or file system 1812 for the computer system to identify the software. For example, the software identifier 1806 may parse a process or task log of a computer system to identify software engaged in malicious network communication. Alternatively the software identifier 1806 may identify software based on network characteristics of malicious network traffic for which the event 1802 was received such as a port and/or address identifier such as by way of a mapping of network ports, connections or addresses to applications, services or processes which may communicate, listen, wait or engage in communications corresponding to the malicious network traffic.

The malicious software detector further includes a CFD evaluator 1808 for evaluating a measure of CFD for a sequence of data substantially as hereinbefore described. Previously the evaluation of CFD has been described with respect to a portion of network traffic. In relation to the CFD evaluator 1808 of FIG. 18 a CFD measure is evaluated for a portion of software such as a portion of executable code, object code, byte code, source code, process code, code in execution or code loaded into a memory for execution and the like. While the CFD evaluator 1808 of FIG. 18 is operable on different data to that previously described the nature of operation of the CFD evaluator 1808 is substantially the same as previously described in that the CFD evaluator 1808 operates on a portion of data such as a sequence of bytes occurring in or for a piece of software identified by the software identifier 1806. The particular portion of software for evaluation of a CFD can be determined based on a fixed portion, an apportionment of the whole software into discrete sub-portions, or an iterative algorithm for identifying a most promising portion of the software for characterizing the software based on a CFD value. Thus the techniques generally described above with respect to FIGS. 9, 10, 11 and 12 could equally be applied to software data such as executable code where a window (or portion) of the software code is identified based on evaluations of CFD for multiple portions of the software to identify a portion (window) for the software that is a promising characterization of the software for identifying similar software based on the CFD measure, such similar software being so identified as potentially malicious software.

The CFD evaluator 1808 is operable both to evaluate a CFD measure for software known or determined to be involved in malicious network traffic and to check if new software may be involved in malicious network traffic. When evaluating a CFD measure for software known or determined to be involved in malicious network traffic, the CFD evaluator 1808 stores the evaluated CFD measure as a reference measure of CFD 1816 in a data store 1814 for future retrieval and comparison with measures of CFD for other software.

In use the malicious software detector 1804 is triggered 1822 to check if new software may be involved in malicious network traffic when new software 1820 is received, stored or executes in or from a memory or file system 1812 of the computer system. In response to such a trigger, the CFD evaluator 1808 evaluates a measure of CFD for the new software and the CFD comparator 1808 operates to check if the new software may be involved in malicious network traffic by retrieving the reference measure of CFD 1816 from the store 1814 and comparing with the CFD measure evaluated for the new software. Where the comparison determines a degree of similarity between the CFD measures the malicious software detector 1804 generates a malicious software event 1824. The malicious software event 1824 may prompt, trigger or lead to protective or remedial action in respect of the new software such as action that may take place on identification of malicious software in a computer system. Such action may include: quarantine of the software; deletion of the software; informing a user of the software; restricting the operation of the software; preventing execution of the software; restricting resources available to the software; elevating a security level of operation of a computer system; and the like.

Figure 19:
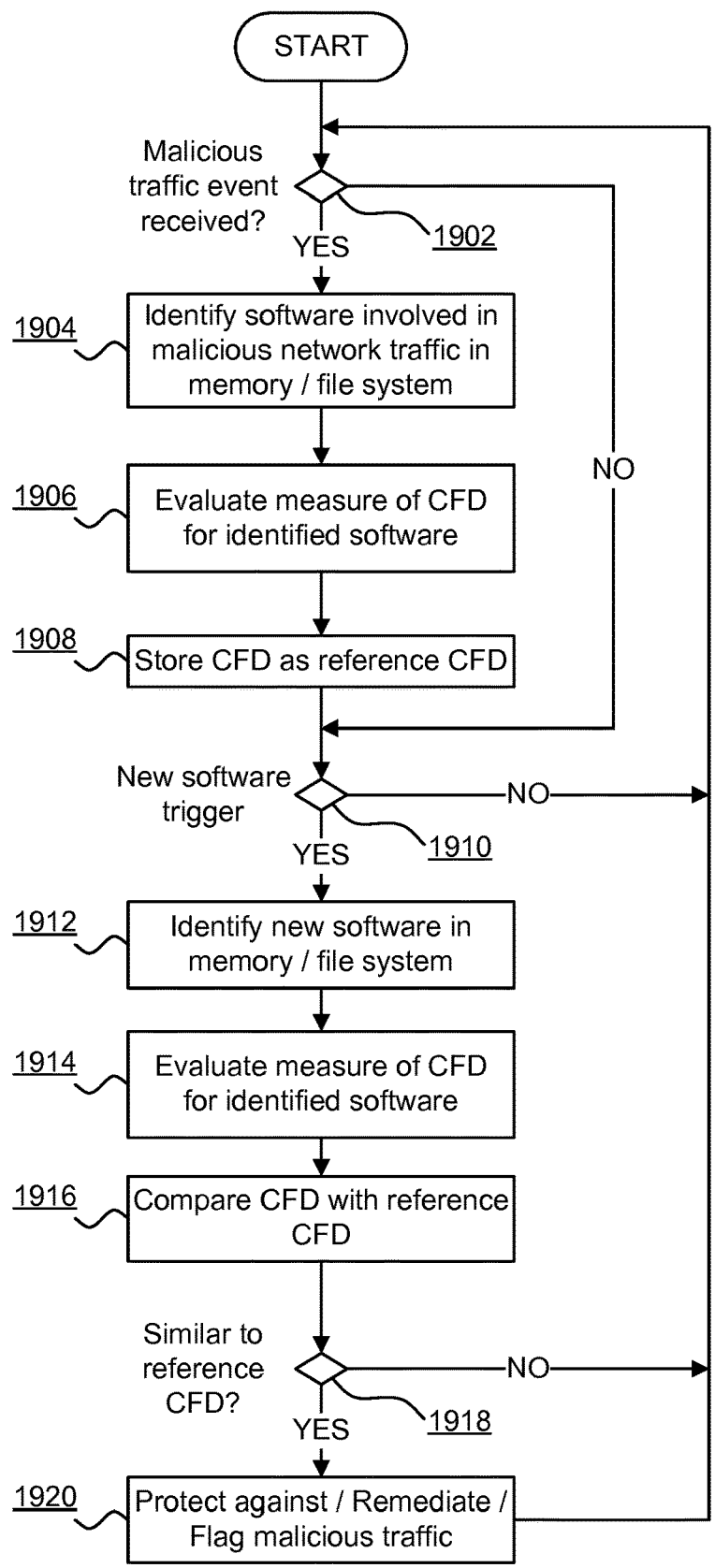
FIG. 19 is a flowchart of a method of the malicious software detector of FIG. 18 in accordance with an embodiment of the present disclosure.

FIG. 19 is a flowchart of a method of the malicious software detector 1804 of FIG. 18 in accordance with an embodiment of the present disclosure. Initially at 1902 the method determines if a malicious traffic event is received. Where a malicious traffic event is received the software identifier 1806 identifies software involved in the malicious traffic in a memory or file system operating with the computer system at 1904. At 1906 the CFD evaluator 1808 evaluates a measure of CFD for the identified software and the measure of CFD is stored as a reference measure of CFD 1816 at 1908.

The activity at 1910 is performed following 1908 or in the event no malicious software event was received at 1902. At 1910 the method determines if new software has been installed, received, executed or otherwise accessed at the computer system. For example, the method may receive a trigger 1822 of new software stored in a memory or file system 1812. On positive determination at 1910 the software identifier 1806 identifies the new software at 1912. At 1914 the CFD evaluator evaluates a measure of CFD for the new software and at 1916 the CFD comparator 1810 compares the evaluated CFD for the new software with the reference measure of CFD to determine a degree of similarity of the CFD values. At 1918 the method determines if there is sufficient similarity between the CFD values and, on positive determination, the malicious software detector 1804 undertakes a responsive action at 1920 such as performing protective, remedial and/or flagging actions in response to the identification of similar CFD. The method returns to 1902 for iteration.

Identification of software involved in malicious network communication may constitute identification of malicious software or malware. Where the nature, effect, modus operandi and/or consequence of such malware is already known then an appropriate protection and/or remediation mechanism may also be known and can be employed in response to the detection of the malware. Some malware seeks to increase its resilience to protective and/or remediation measures by combining multiple malware components within the software. Thus, a software component can consist of multiple malware components or can be derived from multiple malwares such that the software component constitutes a combination risk or exposure to any infected computer system. For example, a malicious software component can include a malicious software originating from multiple families of malware having multiple and potentially disparate effects. The identification of such malware may not comprehensively identify all malware types included in the malicious software and protective or remediation measures may not be comprehensive to fully protect against or remediate all families, types or varieties of malware included in the software component.

Figure 20:
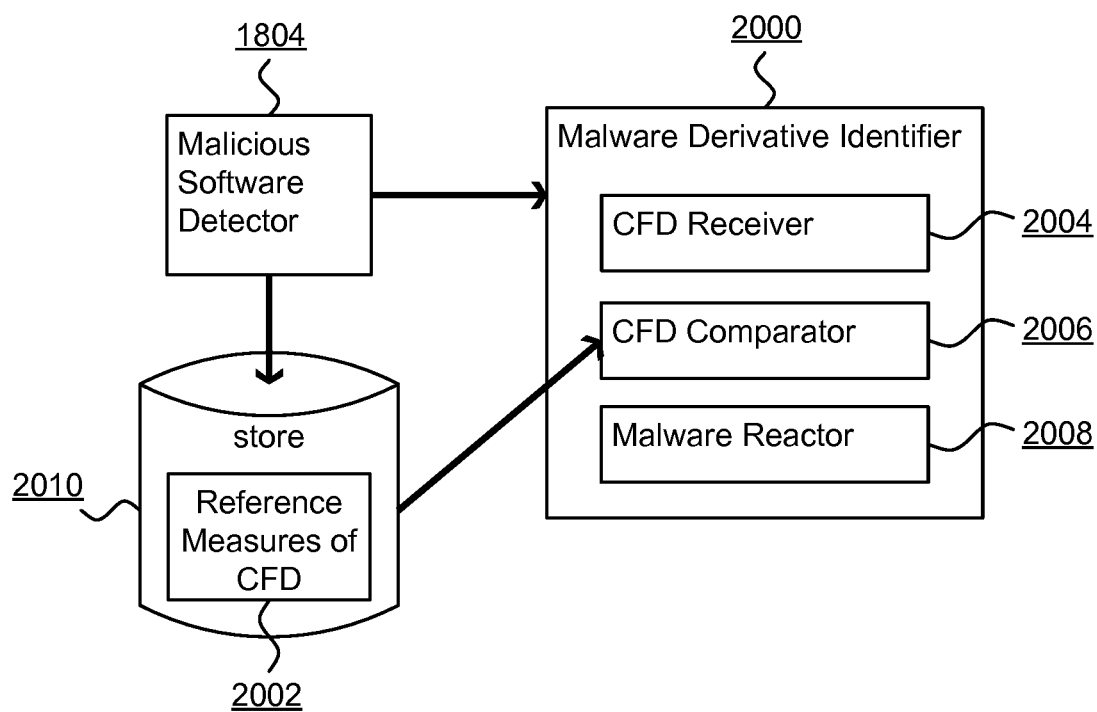
FIG. 20 is a component diagram of the malware derivative identifier in accordance with an embodiment of the present disclosure.

To address this challenge, embodiments of the present disclosure include a malware derivative identifier 2000. FIG. 20 is a component diagram of the malware derivative identifier 2000 in accordance with an embodiment of the present disclosure. The malware derivative identifier 2000 is a software, hardware, firmware or combination component for identifying known malware software that a new identified malware software component may be derived from or may include portions of. That is to say that the malware derivative identifier 2000 is adapted to identify portions, behavior, aspects or elements of known malware that may exist in a newly identified malware component. The identifier 2000 can receive an identification of software found to be involved in malicious network communication from the malicious software detector 1804. Alternatively the function of the identifier 2000 can operate with, as part of or integral to the malicious software detector 1804. The identifier 2000 further accesses a data store 2010 containing a plurality of reference measures of CFD 2002 each reference measure for known malware components. Thus the reference measures 2002 include multiple CFD measures for each of multiple known malware components. Notably, each CFD measure for the known malware and for newly identified malware can constitutes a series of different measures of CFD varying in accordance with the resolution or radius employed for fractal dimension evaluation so as to produce, when plotted, a slope of potentially varying gradient with respect to resolution.

The identifier 2000 includes a CFD receiver 2004 for obtaining (either by evaluating or by receiving from the detector 1804 or a CFD evaluator) a CFD value as a representation of CFD slope for the newly identified malware software component. The identifier further includes a CFD comparator for comparing the CFD slope for the new malware with the CFD slopes for multiple known malware components with reference to the reference measures of CFD 2002 constituting reference CFD slopes for each known malware. The CFD comparator can divide the CFD slope for the new malware into portions of discrete linear gradient for comparison with multiple malware CFD slopes to identify, for each portion at each resolution or range or resolutions of CFD evaluation, known malware having a similar gradient as a CFD value. This division of the CFD slope into portions provides for the potential identification of multiple known malwares, each of which can be protected against or remediated by reactive action by the malware reactor 2008. The malware reactor 2008 is adapted to implement reactive measures for each known malware component identified to have a CFD value for a portion of CFD slope that is at least partly similar to the CFD slope of the newly identified malware. In this way the computer system can protect against the newly identified malware even where the malware is derived from, based on or implements potentially multiple known malwares or derivatives thereof.

Figure 21:
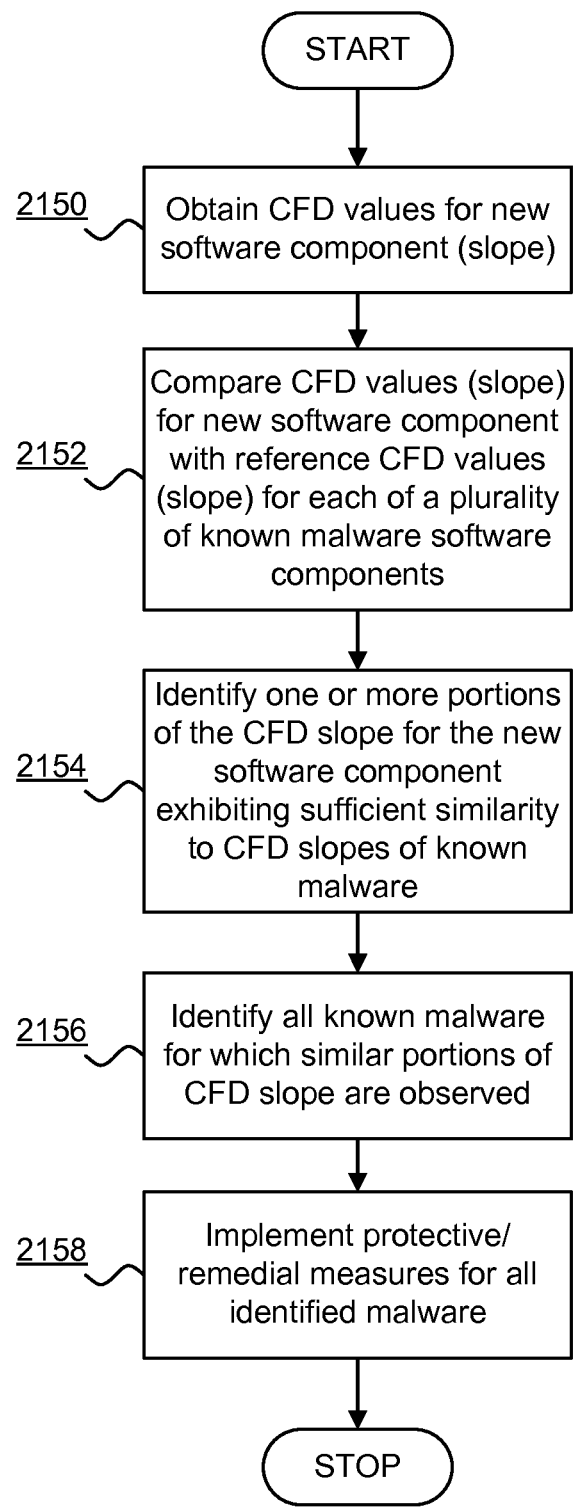
FIG. 21 is an exemplary flowchart of a method of the malware derivative identifier of FIG. 20 in an embodiment of the present disclosure.

FIG. 21 is an exemplary flowchart of a method of the malware derivative identifier 2000 of FIG. 20 in an embodiment of the present disclosure. Initially at 2150 the CFD receiver 2004 obtains CFD values for the new identified malware, the CFD values corresponding to potentially multiple gradients in the CFD slope for the new malware. At 2152 the CFD comparator 2006 compares the CFD values (slope) of the new malware with each set of reference CFD values (slope) for each known malware in the reference measures of CFD 2002. At 2154 the CFD comparator 2006 identifies one or more portions of the CFD slope for the new malware exhibiting sufficient similarity to CFD slopes of known malware. Notably, this might include exhibiting sufficient similarity to portions of CFD slopes of known malware. A degree of sufficient similarity can be predefined and can include a similarity of linear gradient at one or more ranges of resolution such that a minimum range of resolutions is required across which sufficient similarity of linear gradient is observed so as to avoid point-similarity between slopes (i.e. to ensure the extent of similarity is beyond de minimis). Notably, the degree of similarity can be only a similarity of gradient, or a similarity of slope including the particular location of the slope in a CFD graph so as to require also a similarity of magnitude of plotted values also (i.e. constituting a literal similarity of slope). At 2156 the identifier 2000 identifies all known malwares for which sufficient similarity is observed and at 2158 the malware reactor 2008 implements protective and/or remedial measures for all identified malwares.

FIG. 22 depicts the comparison of an illustrative CFD slope for a new malware with a CFD slope for each of a plurality of known malware in accordance with an embodiment of the present disclosure. The new malware CFD slope 2100 is depicted by a broken line in each graph and a known malware CFD slope is depicted by an unbroken line in each graph. In the example of FIG. 22 similarity of CFD slopes is identified where both gradient and magnitude of plotted values match such that similarity occurs when slopes generally overlap or track each other within a predetermined margin. Considering Malware A it can be seen that the new malware CFD slope 2100 has gradient similarity to, and generally tracks, Malware A CFD slope 2102 for a portion 2190 and such extent of similarity may be considered sufficient for identifying the new malware as potentially including or being derived from Malware A. Considering Malware B it can be seen that there is no gradient similarity or tracking between the new malware CFD slope 2100 and the Malware B CFD slope 2104. Considering Malware C it can be seen that there is no gradient similarity or tracking between the new malware CFD slope 2100 and the Malware C CFD slope 2106. Considering Malware D it can be seen that the new malware CFD slope 2100 has gradient similarity to, and generally tracks, Malware D CFD slope 2108 for a considerable portion 2192 and such extent of similarity may be considered sufficient for identifying the new malware as potentially including or being derived from Malware D. Considering Malware E it can be seen that the new malware CFD slope 2100 has gradient similarity to, and generally tracks, Malware E CFD slope 2110 for a small portion 2192. Depending on a predetermined threshold level of similarity required, it may be that such extent of similarity to the CFD slope of Malware E is insufficient for identifying the new malware as potentially including or being derived from Malware E. Considering Malware F it can be seen that there is no gradient similarity or tracking between the new malware CFD slope 2100 and the Malware F CFD slope 2112. Thus, depending on a predefined sufficient degree of similarity required by an embodiment of the present disclosure, the new malware considered with respect to FIG. 22 may be similar to, derived from or include software of known Malware A and Malware D and remedial and/or protective measures for these known malwares can be implemented.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the claims.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to identify malicious network traffic communicated via a computer network, the method comprising:
   evaluating a measure of a correlation fractal dimension for a portion of network traffic over a monitored network connection, the portion of network traffic defined by at least one protocol-specific starting portion and at least one protocol-specific ending portion; and
   comparing the measure of correlation fractal dimension with a reference measure of correlation fractal dimension for a corresponding portion of network traffic of a malicious network connection so as to determine if malicious network traffic is communicated over the monitored network connection.

2. A non-transitory computer-readable storage medium storing computer program code to, when loaded into a computer system and executed thereon, cause the computer to perform the method as claimed in claim 1.

3. The method of claim 1, further comprising, in response to a determination that malicious network traffic is communicated over the monitored network connection, triggering a protective component to protect an endpoint of the monitored network connection from the malicious network traffic.

4. The method of claim 3, wherein the protective component is operable to undertake one or more of: terminating the monitored network connection; initiating a scan for malware installed at an endpoint computer system; or adapting a level of security of an endpoint computer system or network connection.

5. A malicious network traffic detector connected to a computer network, the malicious network traffic detector comprising:
    a correlation fractal dimension (CFD) evaluator;
    a CFD comparator; and
    a store storing a reference measure of CFD of a portion of network traffic of a malicious network connection,
    wherein the CFD evaluator is adapted to evaluate a measure of CFD for a corresponding portion of network traffic communicated over the computer network, the corresponding portion of network traffic defined by at least one protocol-specific starting portion and at least one protocol-specific ending portion, and the CFD comparator is adapted to compare the evaluated measure of CFD with the reference measure of CFD so as to determine if malicious network traffic is communicated over the computer network.

6. The malicious network traffic detector of claim 5, further comprising:
    a protective component adapted to undertake one or more of: terminating a connection of the computer network; initiating a scan for malware installed at an endpoint computer system of the computer network ; or adapting a level of security of an endpoint computer system or a network connection,
    wherein the protective component is reactive to a determination of the CFD evaluator that malicious network traffic is communicated over the computer network.

7. A method to identify malicious network traffic communicated via a network between a first computer system and a second computer system, the method comprising:
    monitoring network traffic over the network to detect a network connection as a new network connection;
    identifying characteristics of the new network connection to determine a protocol of the new network connection;
    retrieving a definition of a portion of network traffic for another network connection based on the determined protocol;
    evaluating a measure of correlation fractal dimension (CFD) for a portion of network traffic of the new network connection based on the retrieved definition; and
    comparing the evaluated measure of CFD with a dictionary of one or more CFD measures, each of the one or more CFD measures being associated with a portion of network traffic of a malicious network connection, so as to determine if malicious network traffic is communicated over the new network connection.

8. The method of claim 7, wherein the portion of network traffic is defined such that an evaluated measure of CFD of the portion of malicious network traffic for a malware network communication substantially distinguishes the malware network communication from non-malware network communication.

9. The method of claim 7, wherein the new network connection is provided via a transmission control protocol (TCP) connection, and the portion of network traffic is defined to be a continuous subset of network traffic occurring over the new network connection subsequent to a TCP handshake portion and up to a point in a flow of network traffic on the new network connection where the network traffic is substantially all encrypted.

10. The method of claim 7, wherein each of the one or more CFD measures in the dictionary is a range of CFD values, and the determination that malicious traffic is communicated over the new network connection is based on a determination that the evaluated measure of CFD falls in the range of CFD values in the dictionary.

11. The method of claim 7, wherein each of the one or more CFD measures in the dictionary is determined based on an evaluation of an evaluated measure of CFD for a connection setup portion of known malicious network traffic.

12. The method of claim 7, wherein the portion of network traffic is a continuous subset of the network traffic subsequent to a transport protocol handshake and up to a predetermined endpoint.

13. The method of claim 12, wherein the predetermined endpoint is selected to correspond to an end of an application protocol connection setup portion of network traffic.

14. The method of claim 7, further comprising, in response to a determination that malicious network traffic is communicated over the new network connection, triggering a protective component to protect an endpoint of the new network connection from the malicious network traffic.

15. The method of claim 14, wherein the protective component is operable to undertake one or more of: terminating the new network connection; initiating a scan for malware installed at an endpoint computer system; or adapting a level of security of an endpoint computer system or a network connection.

16. A malicious network traffic detector connected to a computer network, the malicious network traffic detector comprising:
    a monitor adapted to monitor network traffic over the computer network to detect a network connection as a new network connection;
    an analyzer adapted to identify characteristics of the new network connection to determine a protocol of the new network connection;
    a traffic portions definitions store adapted to store, for each of one or more network protocols, a definition of a portion of network traffic for a network connection;
    a correlation fractal dimension (CFD) evaluator adapted to evaluate a measure of CFD for a portion of network traffic of the new network connection, the portion of network traffic being identified from the traffic portions definitions store based on a protocol determined by the analyzer;
    a dictionary data store storing a dictionary of one or more CFD measures, each of the one or more CFD measures being associated with a portion of network traffic of a malicious network connection; and
    a CFD comparator adapted to compare the evaluated measure of CFD with at least one CFD measure in the dictionary data store so as to determine if malicious network traffic is communicated over the new network connection.

17. The malicious network traffic detector of claim 16, further comprising:
    a protective component adapted to undertake one or more of: terminating the new network connection; initiating a scan for malware installed at an endpoint computer system of the new network connection; or adapting a level of security of an endpoint computer system or a network connection, wherein the protective component is reactive to a determination of the CFD comparator that malicious network traffic is communicated over the new network connection.

18. The malicious network traffic detector of claim 16, wherein the identified portion of network traffic is defined such that an evaluated measure of CFD of the portion of malicious network traffic for a malware network communication substantially distinguishes the malware network communication from non-malware network communication.

19. The malicious network traffic detector of claim 16, wherein the new network connection is provided via a transmission control protocol (TCP) connection, and the identified portion of network traffic is defined to be a continuous subset of network traffic occurring over the network connection subsequent to a TCP handshake portion and up to a point in a flow of network traffic on the new network connection where the network traffic is substantially all encrypted.

20. The malicious network traffic detector of claim 16, wherein each of the one or more CFD measures in the dictionary is a range of CFD values, and the determination of the CFD comparator that malicious traffic is communicated over the new network connection is based on a determination that the evaluated measure of CFD falls in the range of CFD values in the dictionary.

21. The method of claim 16, wherein each of the one or more CFD measures in the dictionary is determined based on an evaluation of a measure of CFD for a connection setup portion of known malicious network traffic.

22. The malicious network traffic detector of claim 16, wherein the identified portion of network traffic is a continuous subset of the network traffic subsequent to a transport protocol handshake and up to a predetermined endpoint.

23. The malicious network traffic detector of claim 22, wherein the predetermined endpoint is selected to correspond to an end of an application protocol connection setup portion of network traffic.

\* \* \* \* \*

UNITED STATES PATENT AND TRADEMARK OFFICE
CERTIFICATE OF CORRECTION

PATENT NO. : 10,931,689 B2
APPLICATION NO. : 16/065603
DATED : February 23, 2021
INVENTOR(S) : El-Moussa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this
Thirty-first Day of January, 2023

Katherine Kelly Vidal
*Director of the United States Patent and Trademark Office*